(12) United States Patent
Ishimori et al.

(10) Patent No.: US 10,481,251 B2
(45) Date of Patent: Nov. 19, 2019

(54) RADAR DEVICE AND TARGET DETECTING METHOD

(71) Applicant: FUJITSU TEN LIMITED, Kobe-shi, Hyogo (JP)

(72) Inventors: Hiroyuki Ishimori, Kobe (JP); Hiroki Ishikawa, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 289 days.

(21) Appl. No.: 15/608,232

(22) Filed: May 30, 2017

(65) Prior Publication Data

US 2017/0363732 A1    Dec. 21, 2017

(30) Foreign Application Priority Data

Jun. 21, 2016 (JP) ................................. 2016-122934

(51) Int. Cl.
| | | |
|---|---|---|
| *G01S 13/524* | (2006.01) | |
| *G01S 13/72* | (2006.01) | |
| *G01S 7/40* | (2006.01) | |
| *G01S 13/87* | (2006.01) | |
| *G01S 13/90* | (2006.01) | |
| *G01S 13/93* | (2006.01) | |

(52) U.S. Cl.
CPC ............ *G01S 13/524* (2013.01); *G01S 7/40* (2013.01); *G01S 13/723* (2013.01); *G01S 13/878* (2013.01); *G01S 13/90* (2013.01); *G01S 13/931* (2013.01)

(58) Field of Classification Search
CPC ............ C12Q 1/6886; C12Q 2600/154; G01S 13/345; G01S 13/524; G01S 13/723; G01S 13/878; G01S 13/90; G01S 13/931; G01S 2013/9375; G01S 7/024; G01S 7/354; G01S 7/40
See application file for complete search history.

(56) References Cited

U.S. PATENT DOCUMENTS 6,762,711 B1 *  7/2004  Doerfler .............. G01S 13/4409
                                                                 342/118
2008/0258964 A1 * 10/2008  Schoeberl ............... G01S 7/032
                                                                 342/189

(Continued)

FOREIGN PATENT DOCUMENTS

| JP | 2012-185029 A | 9/2012 |
| JP | 2015-68724 A | 4/2015 |

*Primary Examiner* — Timothy X Pham
(74) *Attorney, Agent, or Firm* — Oliff PLC

(57) ABSTRACT

There is provided a radar device that calculates an angle of a target based on a phase difference between reception signals obtained by receiving reflected waves from the target. A transmitting unit alternately transmits first and second transmission waves having different beam patterns. A calculating unit calculates reception levels of the reception signals, and an estimate angle at which the target is estimated to exist. A first determining unit determines a degree of reliability of a level difference between the reception levels, on the basis of a comparison between the level difference with a reference value which is associated with the estimate angle in advance. A second determining unit determines whether the target exists at the estimate angle, on the basis of a determination result and the reception level based on the first transmission wave.

10 Claims, 18 Drawing Sheets

(56) References Cited

U.S. PATENT DOCUMENTS

| | | | |
|---|---|---|---|
| 2010/0134344 A1* | 6/2010 | Uesato | G01S 3/46 342/156 |
| 2012/0223855 A1* | 9/2012 | Kurono | G01S 7/2925 342/146 |
| 2016/0187479 A1* | 6/2016 | Shibata | G01S 13/87 342/59 |
| 2017/0102453 A1* | 4/2017 | Lim | G01S 7/411 |

* cited by examiner

FIG. 6A

| ESTIMATE ANGLE [deg] | FIRST CANDIDATE ANGLE [deg] (NEGATIVE WRAPPED ANGLE) | SECOND CANDIDATE ANGLE [deg] (UNWRAPPED ANGLE) | THIRD CANDIDATE ANGLE [deg] (POSITIVE WRAPPED ANGLE) | FIRST DESIGN VALUE [dB] | SECOND DESIGN VALUE [dB] | THIRD DESIGN VALUE [dB] |
|---|---|---|---|---|---|---|
| −15 | −60 | −15 | 20 ... | − | 6 | −11 |
| −5 | −44 | −5 | 31 ... | − | 1 | −21 |
| ±0 | −37 | ±0 | 37 ... | 13 | −1 | −13 |
| 5 | −31 | 5 | 44 ... | 26 | −2 | − |
| 15 | −20 | 17 | 60 ... | 10 | −7 | − |

RADAR DEVICE AND TARGET DETECTING METHOD

CROSS-REFERENCE TO RELATED APPLICATIONS

This application is based on and claims priority from Japanese Patent Application No. 2016-122934 filed on Jun. 21, 2016.

TECHNICAL FIELD

The present invention relates to a radar device and a target detecting method.

RELATED ART

In the related art, radar devices which can be mounted, for example, on vehicles, and are configured to transmit transmission waves from vehicles equipped with the radar devices, and receive reflected waves of the transmission waves from targets by a plurality of receiving antennae, and calculate the angle of each target on the basis of the phase differences between a plurality of reflected waves received from the corresponding target are known.

For example, such a radar device mounted on a vehicle may erroneously detect, for example, a different vehicle running in an adjacent lane, from an area in front of the vehicle equipped with the radar device where the different vehicle does not actually exist, due to the position of the different vehicle or the like.

Since phase differences are detected in a range of 360 degrees, in a case where the radar device receives a reflected wave having a phase difference (for example, 420 degrees) exceeding 360 degrees with respect to a transmission wave, the phase of the received reflected wave is wrapped into the phase detection range and thus a phase difference of 60 (=420−360) degrees is calculated. This is the cause of the above-mentioned problem. Hereinafter, unreal targets which are erroneously detected by such wrapping will be referred to as wrapped ghosts.

In order to solve the above-described problem, a radar device which alternately transmits transmission waves having different beam patterns such as narrow-angle beams and wide-angle beams, and calculates the level differences between reflected waves of the transmission waves, and determines whether each target is a wrapped ghost on the basis of the level differences has been proposed (see Patent Document 1 for instance).

Patent Document 1: Japanese Patent Application Publication No. 2012-185029A

However, the technology of the related art described above has room for improvement in order to improve the accuracy of detection on targets.

The reason is specifically that, for example, some objects such as different vehicles running in adjacent lanes may cause polarized waves due to their shapes, and such polarized waves may reduce the accuracy of level differences.

SUMMARY

It is therefore an object of the present invention to provide a radar device and a target detecting method capable of improving the accuracy of detection on targets.

According to an aspect of the embodiments of the present invention, there is provided a radar device configured to calculate an angle of a target based on a phase difference between reception signals obtained by receiving reflected waves from the target with a plurality of receiving antennae, the radar device comprising: a transmitting unit configured to alternately transmit a first transmission wave and a second transmission wave having different beam patterns; a calculating unit configured to calculate reception levels of the respective reception signals of the reflected waves by the first transmission wave and the second transmission wave, and an estimate angle at which the target is estimated to exist, on the basis of the reception signals; a first determining unit configured to determine a degree of reliability of a level difference between the reception levels calculated by the calculating unit, on the basis of a comparison between the level difference with a reference value of the level difference which is associated with the estimate angle in advance; and a second determining unit configured to determine whether the target exists at the estimate angle, on the basis of a determination result of the first determining unit and the reception level based on the first transmission wave.

According to the present invention, it is possible to improve the accuracy of detection on targets.

BRIEF DESCRIPTION OF THE DRAWINGS

Exemplary embodiments of the present invention will be described in detailed based on the following figures, wherein:

FIG. 6A is a view for explaining a first part of a wrapping determining process;

DETAILED DESCRIPTION

Hereinafter, embodiments of a radar device and a target detecting method according to the present invention will be described in detail with reference to the accompanying drawings. However, the present invention is not limited to the following embodiments.

Hereinafter, an overview of a target detecting method according to an embodiment will be described first, with reference to FIGS. 1A to 1E, and then radar devices using the target detecting method according to the embodiment will be described with reference to FIGS. 2 to 11B. With reference to FIGS. 1A to 7B, a first embodiment will be described, and with reference to FIGS. 8A to 11B, a second embodiment will be described.

First Embodiment

First, an overview of a target detecting method according to the present embodiment will be described with reference to FIGS. 1A to 1E. FIGS. 1A to 1E are views for explaining first to fifth parts of the overview of the target detecting method according to the embodiment.

Figure 1A:
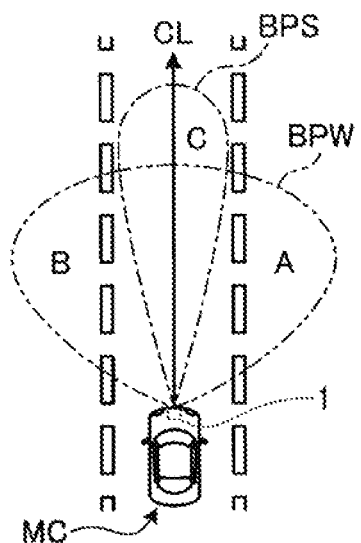
FIG. 1A is a view for explaining a first part of an overview of a target detecting method according to a first embodiment.

As shown in FIG. 1A, a radar device 1 is mounted, for example, inside the front grille of a vehicle MC, and detects targets existing in the traveling direction of the vehicle MC. However, the radar device 1 does not necessarily need to be installed on the front grille, and may be installed at any other position such as front glass, a rear grill, or a left or right part (for example, a left door mirror or a right door mirror).

Further, in the present embodiment, the radar device 1 alternately transmits transmission waves having different beam patterns in the traveling direction of the vehicle MC. Specifically, the radar device 1 transmits a narrow-angle beam BPS and a wide-angle beam BPW.

The narrow-angle beam BPS and the wide-angle beam BPW have the same transmission axis CL. Also, the narrow-angle beam BPS has a transmission range narrower than the transmission range of the wide-angle beam BPW, and has a transmission distance longer than the transmission distance of the wide-angle beam BPW. Therefore, the transmission ranges of the narrow-angle beam BPS and the wide-angle beam BPW partially overlap in front of the radar device 1, that is, in the direction of the transmission axis CL.

Therefore, although the transmission range of the narrow-angle beam BPS relative to the transmission axis CL is narrower than that of the wide-angle beam BPW, the transmission power of the narrow-angle beam is larger than that of the wide-angle beam BPW. Also, a zone C shown in FIG. 1A corresponds to a range in which the radar device 1 can recognize reflected waves having phase differences smaller than 360 degrees (larger than −180 degrees and smaller than +180 degrees). An area on the right side (positive side) from the zone C will be referred to as a zone A. Also, an area on the left side (negative side) from the zone C will be referred to as a zone B.

Figure 1B:
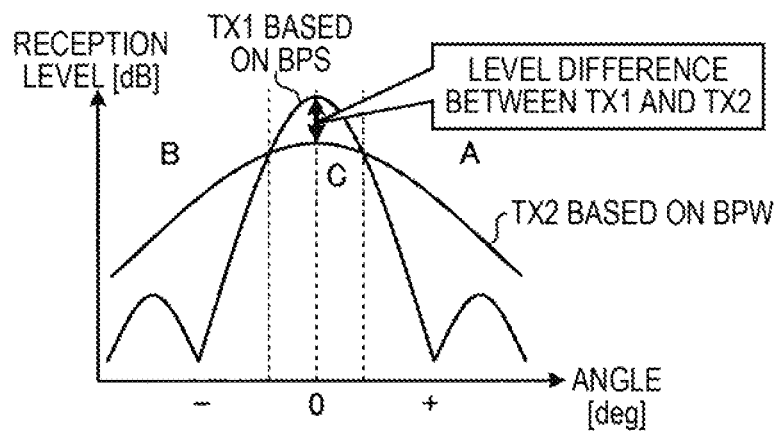
FIG. 1B is a view for explaining a second part of the overview of the target detecting method according to the first embodiment.
Figure 1C:
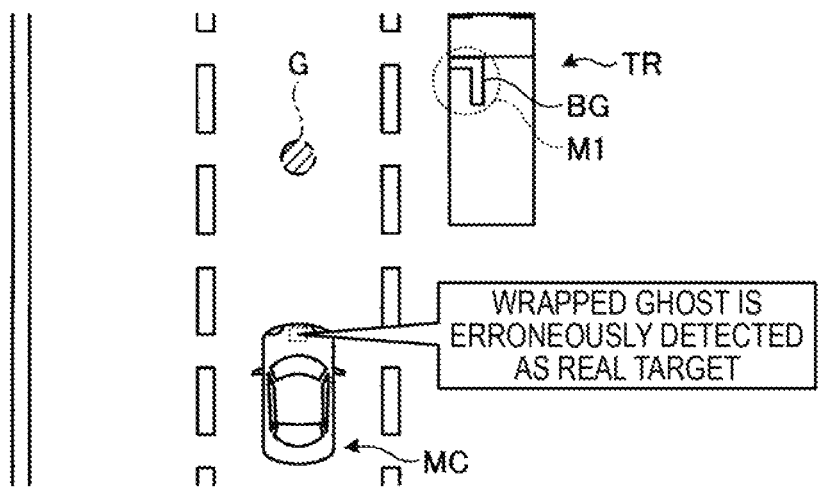
FIG. 1C is a view for explaining a third part of the overview of the target detecting method according to the first embodiment.

FIG. 1B shows the reception levels (reception power levels) of reflected waves of the narrow-angle beam BPS and the wide-angle beam BPW with respect to the incidence angles of the reflected waves. In a case where a target exists in the zone C, as shown in FIG. 1B, the reception level TX1 of the reflected wave of the narrow-angle beam BPS from the target is higher than the reception level TX2 of the reflected wave of the wide-angle beam BPW from the target.

In contrast, in a case where a target is in the zone A or B, the reception level TX1 of the reflected wave of the narrow-angle beam BPS from the target is lower than the reception level TX2 of the reflected wave of the wide-angle beam BPW from the target.

Therefore, it is possible to use the level difference between the reception levels TX1 and TX2 in a wrapping determining process of determining whether a reflected-wave incidence angle measured by the radar device 1 is an unwrapped angle based on an unwrapped phase or a wrapped angle based on a wrapped phase.

Specifically, first, with respect to each measured reflected-wave incidence angle, it is possible to logically determine candidates (hereinafter, referred to as candidate angles) for an actual angle at which a target may actually exist. In other words, the candidate angles include an angle in a case where the corresponding measured incidence angle is not based on wrapping, and angles in a case where the corresponding measured incidence angle is based on wrapping.

Such candidate angles can be associated with level difference reference values on the basis of data (see FIG. 1B for instance) obtained, for example, by experiments or the like, in advance. In other words, the candidate angles relative to each measured incidence angle are mapped onto level differences depending on whether a target actually exists at the corresponding measured incidence angle, respectively. In the present embodiment, such information is provided as map information 74a (see FIG. 2 and the subsequent drawings). A specific example of the map information 74a will be described with reference to FIG. 6A and the subsequent drawings.

Then, a level difference calculated from measured reception levels TX1 and TX2 is compared with each of reference values associated with candidate angles corresponding to a measured incidence angle, whereby which reference value is closer to the calculated level difference is determined. Then, on the basis of whether a candidate angle corresponding to the closest reference value is based on wrapping, it is possible to determine whether the measured incidence angle is based on wrapping, thereby determining whether a target actually exists at the incidence angle.

However, even if such a wrapping determining process is performed as described above, as shown in FIG. 1C, an unreal wrapped ghost G may be erroneously detected as a real target.

Figure 1D:
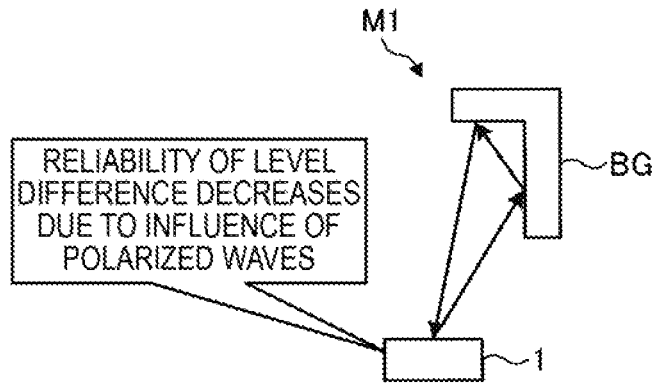
FIG. 1D is a view for explaining a fourth part of the overview of the target detecting method according to the first embodiment.

Here, it is assumed that a truck TR is preceding the vehicle MC in a lane adjacent to the lane of the vehicle MC and the truck TR has a bed loaded with a load BG having substantially an L shape as seen in a plan view. FIG. 1D is an enlarged schematic diagram of a part M1 of FIG. 1C.

As shown in FIG. 1D, for example, the load BG is lying in an inverted L shape as seen from the radar device 1. In this case, two surfaces of the load BG perpendicular to each other may cause a polarized wave as shown by arrows in FIG. 1D.

Such a polarized wave make it impossible to correctly calculate the level difference between the narrow-angle beam BPS and the wide-angle beam BPW, that is, such polarized wave reduce the degree of reliability (accuracy) of the level difference, whereby erroneous detection may be caused. Although the shape of the load BG has been described as a cause of erroneous detection, erroneous detection may be caused, for example, by the shape of the truck TR. For example, the inverted-L shape space formed by the rudder frame and the back of the cabin may cause error detection.

Figure 1E:
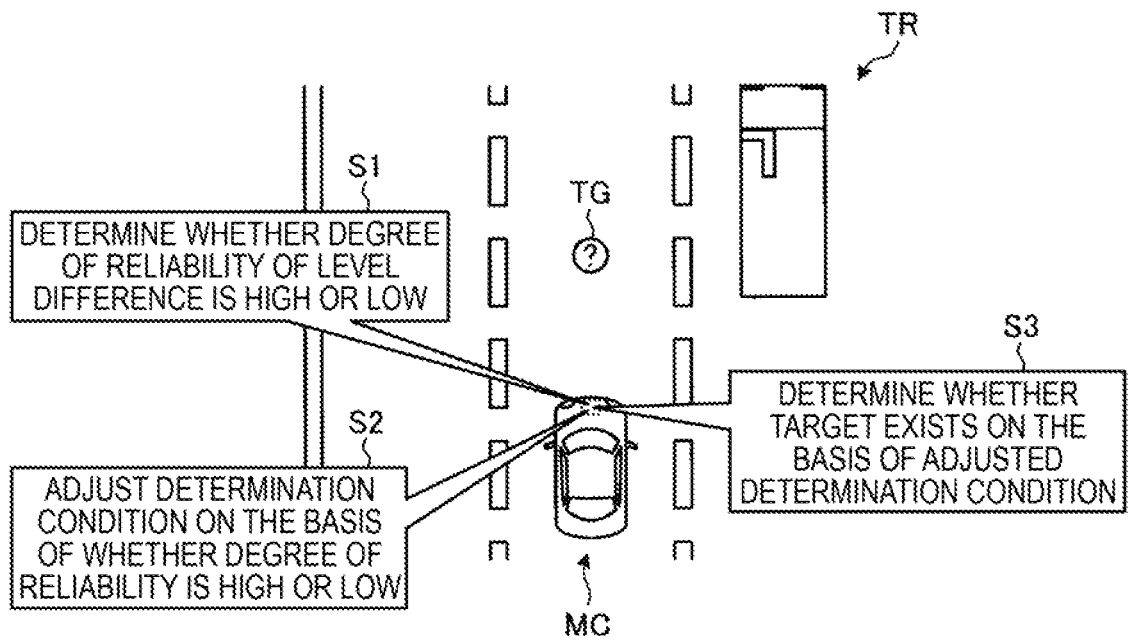
FIG. 1E is a view for explaining a fifth part of the overview of the target detecting method according to the first embodiment.

In the present embodiment, as shown in FIG. 1E, in STEP S1, whether the degree of reliability of the level difference calculated from the measured reception levels TX1 and TX2 is high or low is determined by comparing the level difference with each of the above-described reference values.

Subsequently, in STEP S2, on the basis of whether the degree of reliability is high or low, a determination condition for determining whether a target TG exists at the incidence angle is adjusted. Specifically, in the present embodiment, in a case where the degree of reliability of the calculated level difference is high, since it can be said that the corresponding target is unlikely to be a wrapped ghost, the above-described determination condition is eased.

Meanwhile, in a case where the degree of reliability of the calculated level difference is low, since it can be said that a corresponding target is likely to be a wrapped ghost G, the above-described determination condition is strengthened. In the present embodiment, subsequently, in STEP S3, on the basis of the determination condition adjusted as described above, whether a corresponding target TG exists is determined. In the determination of STEP S3, the reception level TX1 can be used.

Therefore, even if an object, such as the truck TR, having a shape to cause polarized waves to exert a bad influence on detection of the radar device 1 on targets TG is around the vehicle MC, it is possible to accurately determine whether each target TG exists. In other words, it is possible to improve the accuracy of detection on targets TG.

As described above, in the present embodiment, the degree of reliability of the level difference calculated from the measured reception levels TX1 and TX2 is determined by comparing the level difference with each of the reference values associated with the incidence angle in advance.

Further, in the present embodiment, whether the target TG exists at the incidence angle is determined on the basis of the degree of reliability determined and the reception level TX1. Therefore, according to the present embodiment, it is possible to improve the accuracy of detection on targets TG.

Hereinafter, the radar device 1 using the above-described target detecting method will be described in more detail.

Figure 2:
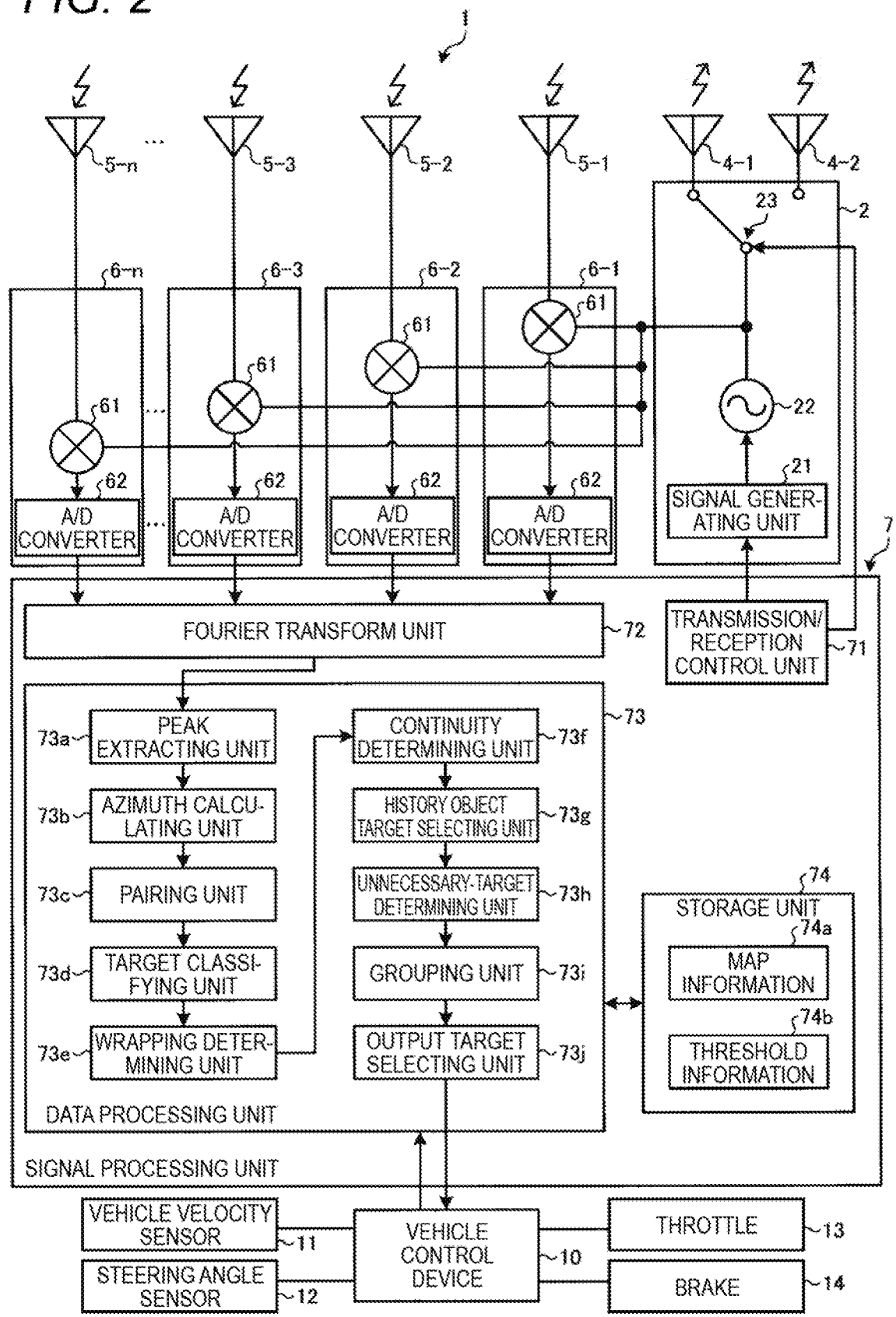
FIG. 2 is a block diagram illustrating a radar device according to the first embodiment.

FIG. 2 is a block diagram illustrating the radar device 1 according to the first embodiment. In FIG. 2, only components necessary for explaining features of the present embodiment are shown by functional blocks, and general components are not shown.

In other words, the components shown in FIG. 2 are functionally conceptual, and do not need to have a physically configuration as shown in FIG. 2. For example, distribution or integration of the individual functional blocks is not limited to a specific mode shown in FIG. 2, and it is possible to distribute or integrate all or a part thereof functionally or physically in an arbitrary unit, depending on various loads, usage conditions, and so on.

As shown in FIG. 2, the radar device 1 includes a signal transmitting unit 2 and transmitting antennae 4-1 and 4-2 as components constituting a signal transmitting system. The signal transmitting unit 2 includes a signal generating unit 21, an oscillator 22, and a switch 23.

Also, the radar device 1 includes receiving antennas 5-1 to 5-$n$ and signal receiving units 6-1 to 6-$n$ as components constituting a signal receiving system. Each of the signal receiving units 6-1 to 6-$n$ includes a mixer 61 and an A/D converter 62. Further, the radar device 1 includes a signal processing unit 7 as a component constituting a signal processing system.

Also, hereinafter, for ease of explanation, the transmitting antennae 4-1 and 4-2 will be collectively referred to as the transmitting antennae 4. Similarly, the receiving antennae 5-1 to 5-$n$ will be collectively referred to as the receiving antennae 5, and the signal receiving units 6-1 to 6-$n$ will be collectively referred to as the signal receiving units 6.

The transmitting unit 2 performs a process of generating transmission signals. The signal generating unit 21 generates modulation signals for transmitting frequency-modulated millimeter waves having a triangular waveform, under control of a transmission/reception control unit 71 of the signal processing unit 7 to be described below. The oscillator 22 generates transmission signals on the basis of modulation signals generated by the signal generating unit 21.

The switch 23 connects any one of the transmitting antennae 4-1 and 4-2 with the oscillator 22. The switch 23 alternately connects the transmitting antennae 4-1 and 4-2 with the oscillator 22 with a predetermined period under control of the transmission/reception control unit 71 to be described below. Also, as shown in FIG. 2, transmission signals generated by the oscillator 22 are distributed even to the mixers 61 to be described below.

The transmitting antennae 4 transmit transmission signals generated by the oscillator 42, as transmission waves, forward from the vehicle MC. From the transmitting antennae 4-1 and 4-2, transmission waves are transmitted in different beam patterns, respectively. For example, the narrow-angle beam BPS is transmitted from the transmitting antenna 4-1, and the wide-angle beam BPW is transmitted from the transmitting antenna 4-2.

If transmission waves transmitted from the transmitting antennae 4 are reflected from a target TG, the receiving antennae 5 receive the reflected waves coming from the target TG, as reception signals. Each of the signal receiving units 6 performs a preliminary process on each reception signal, thereby generating signals to be output to the signal processing unit 7.

Specifically, each of the mixers 61 mixes transmission signals distributed as described above, with reception signals received by a corresponding receiving antenna 5, thereby generating beat signals. Also, between each of the pairs of the receiving antennae 5 and the mixers 61, an amplifier may be disposed.

The A/D converters 62 convert beat signals generated by the mixers 61, into digital signals, and outputs the digital signals to the signal processing unit 7.

The signal processing unit 7 includes the transmission/reception control unit 71, a Fourier transform unit 72, a data processing unit 73, and a storage unit 74.

The data processing unit 73 includes a peak extracting unit 73a, an azimuth calculating unit 73b, a pairing unit 73c, a target classifying unit 73d, a wrapping determining unit 73e, a continuity determining unit 73f, a history object target selecting unit 73g, an unnecessary-target determining unit 73h, a grouping unit 73i, and an output target selecting unit 73j.

The storage unit 74 is a storage device such as a hard disk, a non-volatile memory, or a register, and in the storage unit 74, the map information 74a is stored.

The transmission/reception control unit 71 controls the signal transmitting unit 2 including the signal generating unit 21 and the switch 23 described above. Although not shown in FIG. 2, the transmission/reception control unit 71 also controls the signal receiving units 6.

The Fourier transform unit 72 performs Fourier transform on beat signals input from the A/D converters 62, and then outputs the beat signals to the peak extracting unit 73a of the data processing unit 73.

The peak extracting unit 73a extracts peak frequencies of peaks from the Fourier transform results of the Fourier transform unit 72, and outputs the extracted peak frequencies to the azimuth calculating unit 73b. Also, the peak extracting unit 73a extracts peak frequencies of UP sections and DOWN sections of beat signals (to be described below), respectively.

The azimuth calculating unit 73b calculates the incidence angles and intensities (reception levels) of reflected waves corresponding to the peak frequencies extracted by the peak extracting unit 73a. At this time, the incidence angles include angles based on phase wrapping, and are estimates of the angles at which the targets TG exist. Therefore, the incidence angles will be referred to as estimate angles. Also, the azimuth calculating unit 73b outputs the calculated estimate angles and the calculated reception levels to the pairing unit 73c.

On the basis of the calculation results of the azimuth calculating unit 73b, the pairing unit 73c determines correct pairs of peak frequencies of the UP sections and the DOWN sections, and calculates the distance and relative velocity of each target TG from the pairing results. Also, the pairing unit 73c outputs information including the estimate angles, distances, and relative velocities of the individual targets TG to the target classifying unit 73d.

In order to facilitate understanding of the following description, the sequence of the above-described processes of the signal processing unit 7 will be described with reference to FIG. 3 and FIGS. 4A to 4C.

Figure 3:
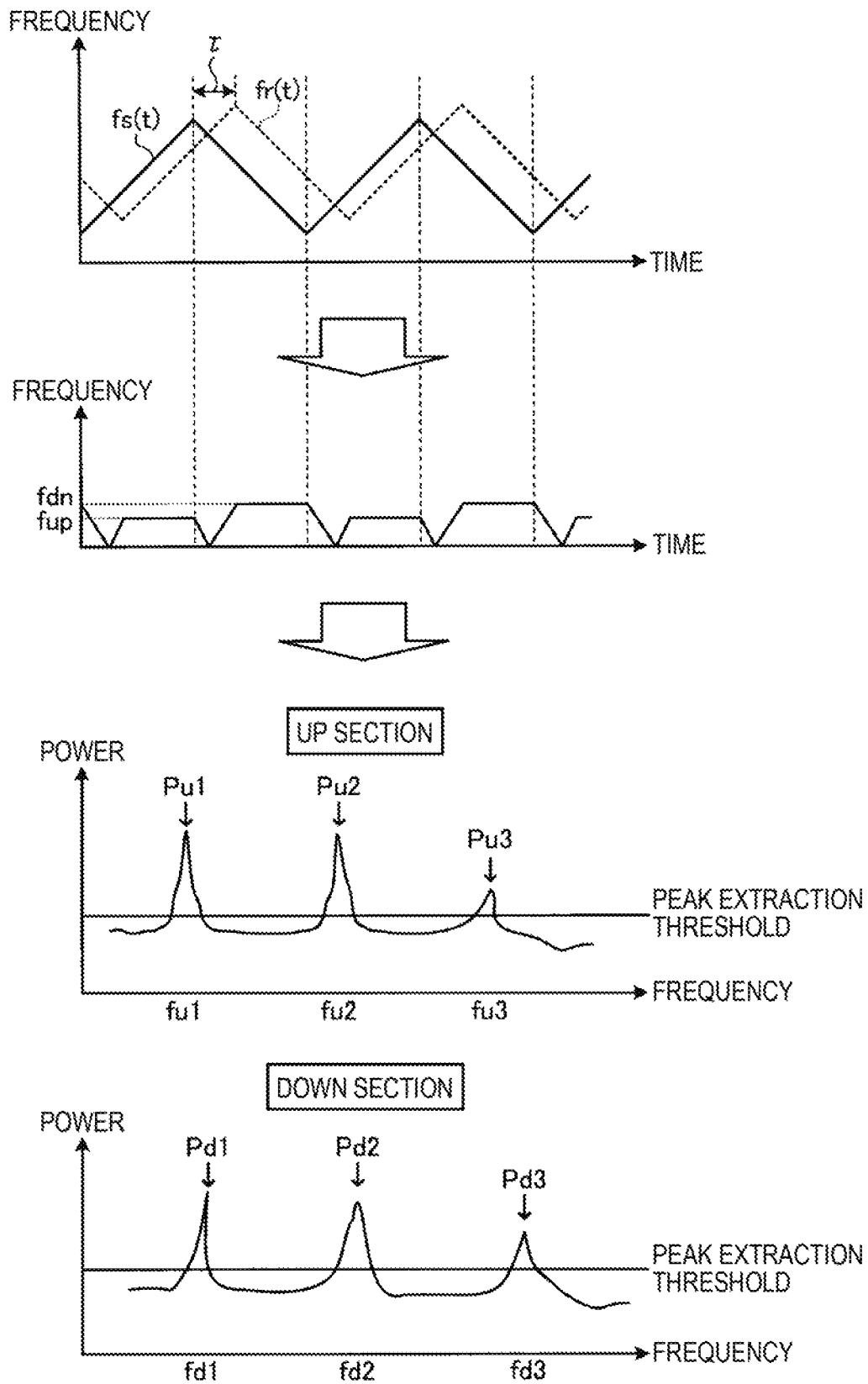
FIG. 3 is a view for explaining a procedure from a preliminary process of a signal processing device to a peak extracting process of the signal processing device.
Figure 4A:
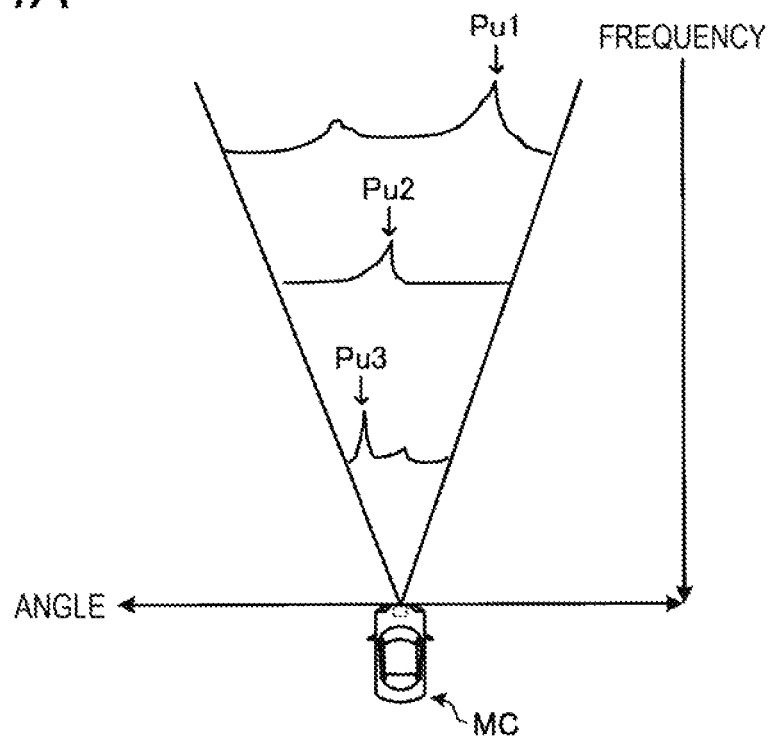
FIG. 4A is a view for explaining an azimuth calculating process.
Figure 4B:
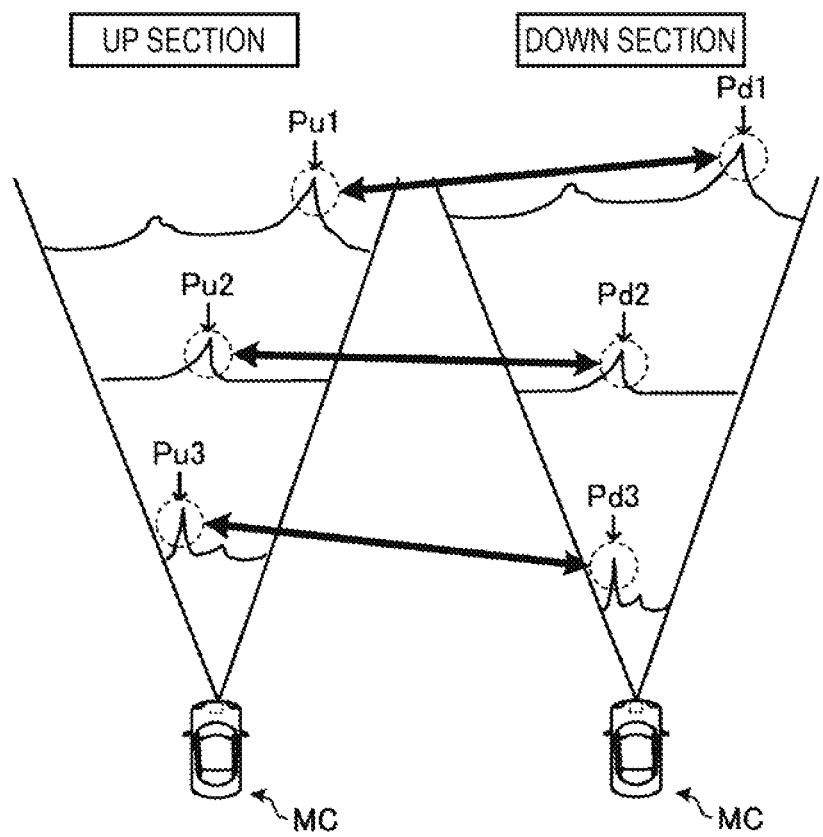
FIG. 4B is a view for explaining a first part of a pairing process.
Figure 4C:
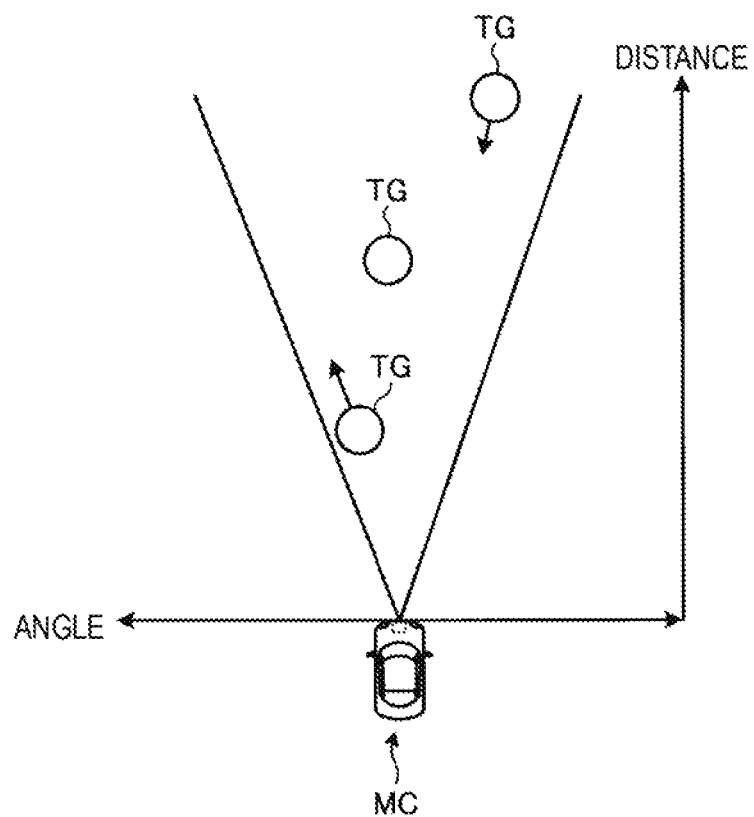
FIG. 4C is a view for explaining a second part of the pairing process.

FIG. 3 is a view for explaining the procedure from the preliminary process for the signal processing unit 7 to the peak extracting process of the signal processing unit 7. Also, FIG. 4A is a view for explaining the azimuth calculating process. Also, FIGS. 4B and 4C are views for explaining first and second parts of the pairing process, respectively.

Also, FIG. 3 has three areas divided by two white bold down arrows. Those areas hereinafter will be referred to as an upper part, a middle part, and a lower part in the order of them.

As shown in the upper part of FIG. 3, after a transmission signal fs(t) is transmitted as a transmission wave from the transmitting antennae 4, if the reflected waves of the transmission wave from targets TG reach the radar device, the reflected waves are received as a reception signal fr(t) by each receiving antenna 5.

In this case, as shown in the upper part of FIG. 3, with respect to the transmission signal fs(t), the reception signal fr(t) has a time lag T according to the distance between the vehicle MC and the target TG. The reception signal fr(t) and the transmission signal fs(t) are mixed, whereby a beat signal is obtained as an output signal. In the beat signal, due to the Doppler effect based on the relative velocity between the vehicle MC and the target TG, the frequency fup of UP sections in which the frequency of the transmission signal increases and the frequency fdn of DOWN sections in which the frequency of the transmission signal decreases are repeated (see the middle part of FIG. 3).

The Fourier transform unit 72 performs Fourier transform on the beat signal, and the UP sections and the DOWN sections of the Fourier transform result are schematically shown in the lower part of FIG. 3.

In the frequency domain, the UP sections and the DOWN sections of the Fourier transform result have waveforms as shown in the lower part of FIG. 3. From those waveforms, the peak extracting unit 73a extracts peak frequencies of peaks.

For example, in the example shown in the lower part of FIG. 3, with reference to a peak extraction threshold, in the UP sections, peaks Pu1 to Pu3 are determined as peaks, and the peak frequencies fu1 to fu3 thereof are extracted.

Also, in the DOWN sections, similarly, with reference to the peak extraction threshold, peaks Pd1, Pd2, and Pd3 are determined as peaks, and the peak frequencies fd1, fd2, and fd3 thereof are extracted. The peak extraction threshold may be stored in the threshold information 74b (to be described below) in advance.

Meanwhile, some peak frequencies extracted by the peak extracting unit 73a may include frequency components corresponding to reflected waves from a plurality of targets TG. For this reason, the azimuth calculating unit 73b performs azimuth calculation on each of the peak frequencies, thereby analyzing whether a target TG corresponding to the corresponding peak frequency exists.

The azimuth calculating unit 73b performs the azimuth calculation using a predetermined incidence direction estimating method such as ESPRIT (Estimation of Signal Parameters via Rotational Invariance Techniques). However, the present invention is not limited thereto.

FIG. 4A is a view schematically illustrating the result of the azimuth calculation of the azimuth calculating unit 73b. From the peaks Pu1 to Pu3 of the azimuth calculation results, the azimuth calculating unit 73b calculates estimate angles of targets TG corresponding to the peaks Pu1 to Pu3, respectively. Also, the magnitudes of the peaks Pu1 to Pu3 are handled as reception levels.

The azimuth calculating unit 73b performs the azimuth calculating process on each of the UP sections and the DOWN sections, as shown in FIG. 4B. Also, the azimuth calculating unit 73b performs the azimuth calculating process on each of the reflected waves of the narrow-angle beam BPS and the reflected waves of the wide-angle beam BPW.

In other words, the azimuth calculating unit 73b calculates the reception levels TX1 and TX2 of reflected waves of the narrow-angle beam BPS and the wide-angle beam BPW from the same estimate angle.

Then, on the basis of the azimuth calculation results of the azimuth calculating unit 73b, the pairing unit 73c performs pairing such that a peak of an UP section and a peak of a DOWN section constituting each pair have similar estimate angles and similar reception levels, as shown in FIG. 4B.

Also, on the basis of the pairs of peaks, the pairing unit 73c calculates the distance and relative velocity of each of the targets corresponding to the pairs of peaks. The distance of each target is calculated on the basis of the following relationship: [Distance]∝(fup−fdn). The relative velocity of each target is calculated on the basis of the following relationship: [Velocity]∝(fup−fdn). As a result, as shown in FIG. 4C, pairing results representing the estimate angles, distances, and relative velocities of the individual targets TG relative to the vehicle MC are obtained.

Hereinafter, FIG. 2 will be further described with respect to the target classifying unit 73d. The target classifying unit 73d classifies the individual targets TG into moving objects (such as preceding vehicles and oncoming vehicles) and still objects on the basis of the results of the pairing process of the pairing unit 73c. Then, the target classifying unit 73d outputs the classified results into the wrapping determining unit 73e.

The wrapping determining unit 73e determines the degree of reliability of the level difference between the reception levels TX1 and TX2 calculated by the azimuth calculating unit 73b by comparing the level difference with each of the level difference reference values associated with each estimate angle in advance.

Also, the wrapping determining unit 73e determines whether a corresponding target TG exists at the estimate angle, on the basis of the degree of reliability determined with respect to the level difference and the reception level TX1 of the narrow-angle beam BPS. Then, the wrapping determining unit 73e outputs the determination results to the continuity determining unit 73f.

Figure 5:
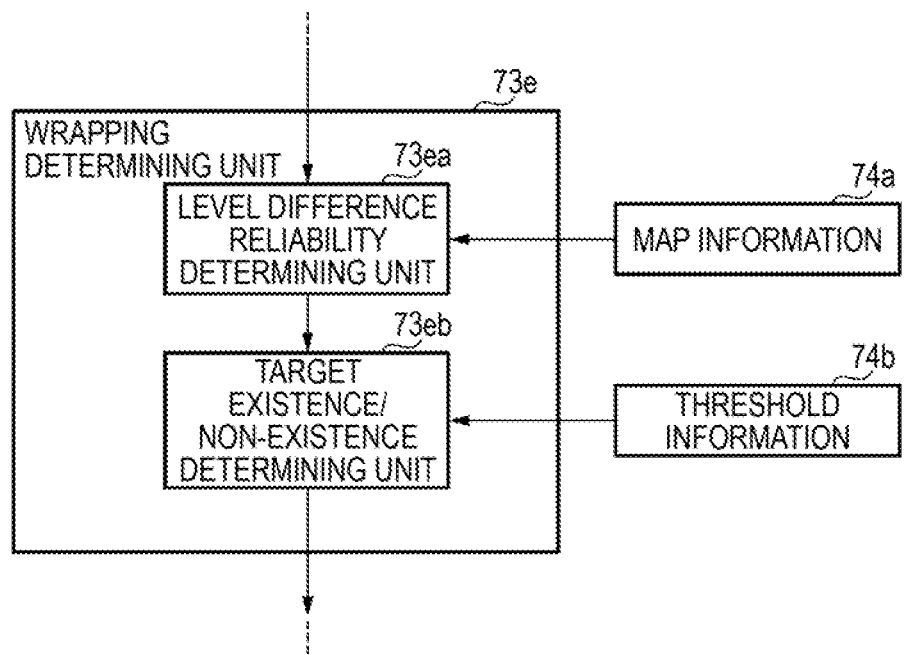
FIG. 5 is a block diagram illustrating a wrapping determining unit.
Figure 6B:
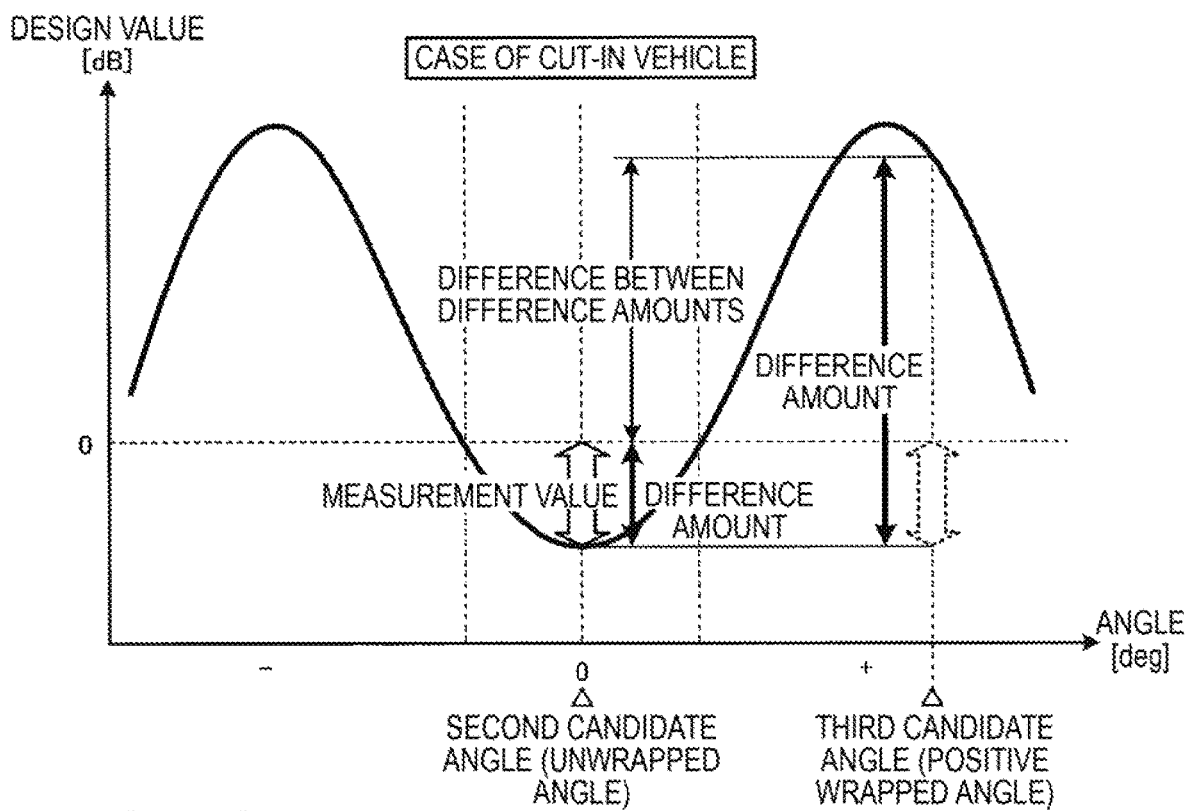
FIG. 6B is a view for explaining a second part of the wrapping determining process.
Figure 6C:
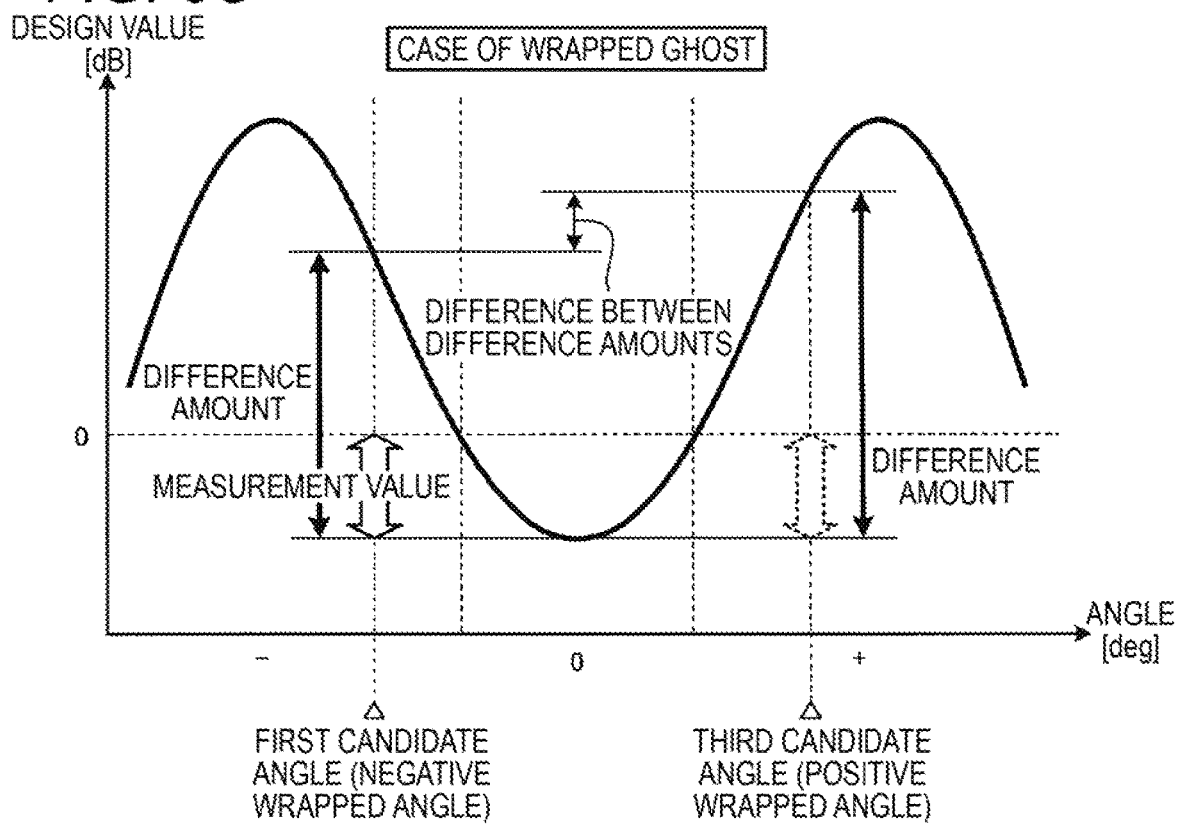
FIG. 6C is a view for explaining a third part of the wrapping determining process.

Hereinafter, the wrapping determining process which is performed by the wrapping determining unit 73e will be described in more detail with reference to FIGS. 5 to 6E. FIG. 5 is a block diagram illustrating the wrapping determining unit 73e. Also, FIGS. 6A to 6E are views for explaining first to fifth parts of the wrapping determining process.

As shown in FIG. 5, the wrapping determining unit 73e includes a level difference reliability determining unit 73ea and a target existence/non-existence determining unit 73eb.

The level difference reliability determining unit 73ea calculates the level difference between the reception levels TX1 and TX2 calculated by the azimuth calculating unit 73b. Also, the level difference reliability determining unit 73ea determines whether the degree of reliability of the level difference is high or low, by comparing the calculated level difference with each of the level difference reference values preset in the map information 74a in association with the candidate angles corresponding to the estimate angle. Also, the level difference reliability determining unit 73ea outputs information on whether the degree of reliability of the level difference is high or low to the target existence/non-existence determining unit 73eb.

According to whether the degree of reliability is high or low determined by the level difference reliability determining unit 73ea, the target existence/non-existence determining unit 73eb adjusts the determination condition for determining whether the target TG exists at the estimate angle.

Specifically, in a case where the degree of reliability of the level difference is high, the target existence/non-existence determining unit 73eb considers that the target is unlikely to be a wrapped ghost G, and sets a predetermined low threshold (a first threshold) included in the threshold information 74b as a determination threshold for determining whether the target TG exists, whereby the above-described determination condition is eased.

Meanwhile, in a case where the degree of reliability of the level difference is low, the target existence/non-existence determining unit 73eb considers that the target is likely to be a wrapped ghost G, and sets a predetermined high threshold (a second threshold) included in the threshold information 74b as the above-mentioned determination threshold, whereby the above-described determination condition is strengthened.

Then, in a case where the reception level TX1 exceeds the determination threshold, the target existence/non-existence determining unit 73eb determines that the target TG corresponding to the estimate angle is not a wrapped ghost G and actually exists; whereas in a case where the reception level TX1 is equal to or lower than the determination threshold, the target existence/non-existence determining unit determines that the target TG corresponding to the estimate angle is a wrapped ghost G.

Subsequently, the target existence/non-existence determining unit 73eb outputs the determination result to the subsequent processing unit (the continuity determining unit 73f).

The wrapping determining process will be described in more detail. First, a specific example of the map information 74a is shown in FIG. 6A. As shown in FIG. 6A, the map information 74a is set in advance, and includes, for example, first to candidate angles corresponding to each of measured estimate angles, and first to third design values corresponding to the first to third candidate angles, respectively.

The design values are, for example, values obtained by deriving the reception levels TX1 of the narrow-angle beams BPS from the reception levels TX2 of the wide-angle beams BPW, for example, by experiments, and subtracting the reception levels TX1 from the reception levels TX2. The first to third candidate angles are angles at which the targets TG may actually exist, with respect to the estimate angles calculated by the azimuth calculating unit 73b.

The first candidate angles are negative wrapped angles obtained by subtracting 360° from phase differences corresponding to the estimate angles. The second candidate angles are unwrapped angles of the same phases as phases corresponding to the estimate angles. The second candidate angles are the same as the estimate angles. The third candidate angles are positive wrapped angles obtained by adding 360° to the phase differences corresponding to the estimate angles.

With respect to the level difference calculated from reception levels TX1 and TX2 by the azimuth calculating unit 73b, which of the first to third design values of the first to third candidate angles associated with a corresponding estimate angle is closest to the level difference may be determined by comparing level difference with the first to third design values, without considering the level difference is high or low. In this case, one of the first to third candidate angles corresponding to the closest one of the first to third design values is determined as an actual angle.

However, since the calculated level difference may be incorrect due to the influence of polarized waves attributable to the shape of the target TG or the like, as described above, it is preferable to consider whether the degree of reliability of the level difference is high or low. Therefore, the level difference reliability determining unit 73ea calculates the difference amounts between the level difference and the first to third design values of the first to third candidate angles. In a case where the difference between the difference amounts exceeds a predetermined threshold, the level difference reliability determining unit determines that the degree of reliability is high; whereas in a case where the difference between the difference amounts is equal to or smaller than the threshold, the level difference reliability determining unit determines that the degree of reliability is low.

This will be described in more detail. Waveforms shown in FIGS. 6B and 6C are the curves of the design values set in the map information 74a. For example, FIG. 6B shows a waveform in a case where a target TG is a real interruption vehicle (hereinafter, referred to as a cut-in vehicle) and is not influenced by polarized waves.

In this case, it is considered that a level difference (in FIG. 6B, a measurement value) is correctly calculated by the azimuth calculating unit 73b, and an estimate angle calculated by the azimuth calculating unit 73b represents, for example, a second candidate angle which is an unwrapped angle.

In this case, for example, the difference between the difference amounts between the measurement value and design values corresponding to the second candidate angle and the third candidate angle which is a positive wrapped angle tend to be larger than those in the case of FIG. 6C to be described below.

In contrast, for example, FIG. 6C shows a case where a target TG is a wrapped ghost influenced by polarized waves.

In this case, it is considered that a level difference (in FIG. 6C, a measurement value) is not correctly calculated by the azimuth calculating unit 73b, and an estimate angle calculated by the azimuth calculating unit 73b represents, for example, a first candidate angle which is a negative wrapped angle, not a second candidate angle. In other words, it is considered that the pair of the estimate angle and the level difference is logically inappropriate.

In this case, for example, the difference between the difference amounts between the measurement value and design values corresponding to the first candidate angle and the third candidate angle tend to be smaller than those in the case of FIG. 6B.

Figure 6D:
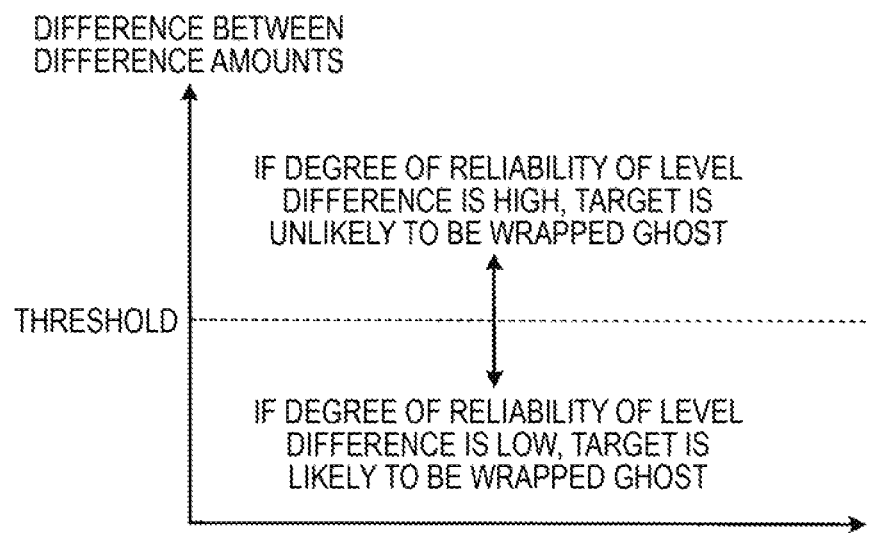
FIG. 6D is a view for explaining a fourth part of the wrapping determining process.
Figure 6E:
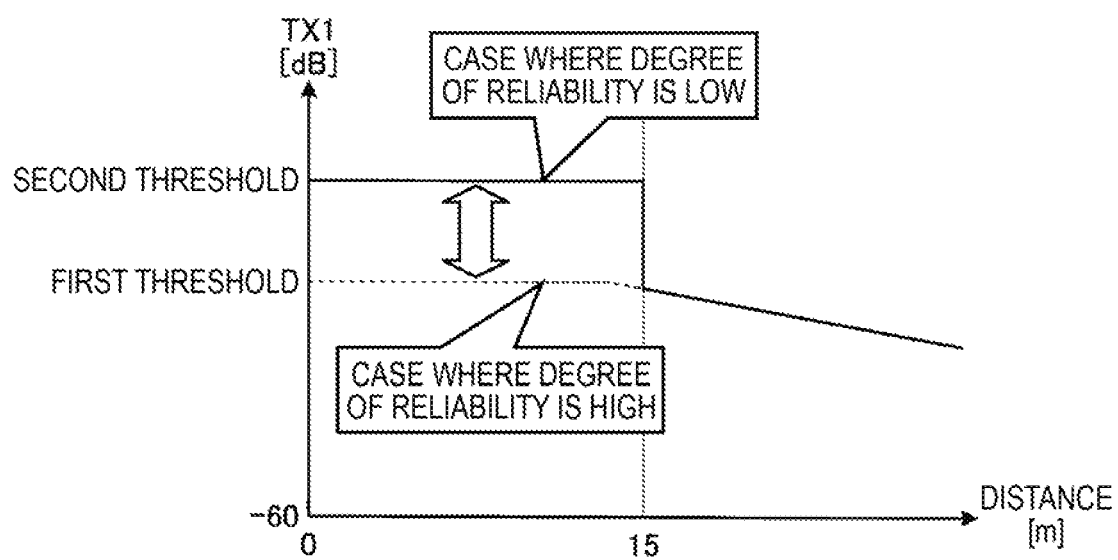
FIG. 6E is a view for explaining a fifth part of the wrapping determining process.

Therefore, as shown in FIG. 6D, in a case where the difference between the above-described difference amounts exceeds the predetermined threshold, the level difference reliability determining unit 73ea determines that the degree of reliability of the level difference is high (i.e., the target is unlikely to be a wrapped ghost G); whereas in a case where the difference between the difference amounts is equal to or smaller than the threshold, the level difference reliability determining unit determines that the degree of reliability of the level difference is low (i.e., the target is likely to be a wrapped ghost G). As described above, whether the degree of reliability of the level difference is high or low is considered. In this way, it is possible to prevent real targets TG from being erroneously determined as wrapped ghosts G.

Therefore, as shown in FIG. 6E, in a case where the level difference reliability determining unit 73ea determines that the degree of reliability of the level difference is high, the target existence/non-existence determining unit 73eb sets the first threshold which is a low threshold for easing the determination condition, as the determination threshold.

Meanwhile, in a case where the level difference reliability determining unit 73ea determines that the degree of reliability of the level difference is low, the target existence/non-existence determining unit 73eb sets the second threshold which is a high threshold for strengthening the determination condition, as the determination threshold. In this way, it is possible to ease or strengthen the determination condition according to whether the degree of reliability of the level difference is high or low. Therefore, even in a case where level differences are not correctly calculated due to the influence of polarized waves, it is possible to prevent erroneous determination, and accurately detect targets TG.

Further, the target existence/non-existence determining unit 73eb determines whether the target TG exists, on the basis of the reception level TX1 and the determination threshold.

Hereinafter, FIG. 2 will be further described with respect to the continuity determining unit 73f. With respect to the instantaneous value of each of the targets TG obtained as determination objects by the current scanning, the continuity determining unit 73f determines whether the corresponding instantaneous value has continuity with any target TG detected by the previous scanning. Specifically, the continuity determining unit calculates estimate positions of current positions from the positions of targets TG obtained by the previous scanning, and if an instantaneous value obtained in the current scanning is close to an estimate position, the continuity determining unit determines that the corresponding instantaneous value has continuity.

The history object target selecting unit 73g selects data items on a predetermined number of targets TG to be history objects for the subsequent processes. The unnecessary-target determining unit 73h determines whether each target TG is unnecessary for system control. Examples of unnecessary targets TG include, for example, targets corresponding to wrapped ghosts G, targets corresponding to reflection from constructions and walls, and so on. Also, basically, unnecessary targets TG are not output to any external device; however, they may be held inside.

If some of a plurality of targets detected as real targets are assumed to be reflection points of the same object, the grouping unit 73i groups those targets into one target.

The output target selecting unit 73j selects targets TG which need to be output to an external device for system control. Therefore, on the basis of the determination results of the target existence/non-existence determining unit 73eb, the output target selecting unit 73j does not select targets determined as wrapped ghosts G, as output objects. Therefore, it is possible to prevent erroneous system control. For example, in a case of erroneously detecting a vehicle running in an adjacent lane as a vehicle running in front of the vehicle MC, the brake automatically operates. However, according to the present embodiment, it is possible to prevent such a problem. Also, the output target selecting unit 73j outputs target information items on the selected targets TG (including the actual angles, the actual distances, the actual relative velocities, and so on) to the external device.

Here, the external device is, for example, a vehicle control device 10. The vehicle control device 10 is an electronic control unit (ECU) for controlling the component units of the vehicle MC. The vehicle control device 10 is electrically connected to a vehicle velocity sensor 11, a steering angle sensor 12, a throttle 13, and a brake 14.

On the basis of the target information items acquired from the radar device 1, the vehicle control device 10 performs vehicle control such as adaptive cruise control (ACC) or pre-crash safety system (PCS) control.

For example, in a case of performing ACC, the vehicle control device 10 controls the throttle 13 and the brake 14 on the basis of the target information items acquired from the radar device 1, such that the vehicle MC follows a preceding vehicle while keeping a constant distance between the vehicle MC and the preceding vehicle. Also, since the running condition of the vehicle MC frequently varies, whenever the running state changes, the vehicle control device 10 acquires the vehicle velocity, the steering angle, and so on from the vehicle velocity sensor 11, the steering angle sensor 12, and so on, and feeds back the acquired information to the radar device 1.

Also, for example, in a case of performing PCS control, if it is detected on the basis of the target information items acquired from the radar device 1 that there is a preceding vehicle or a still object in the traveling direction of the vehicle MC, and the vehicle MC is likely to collide with that, the vehicle control device 10 decelerates the vehicle MC by controlling the brake 14. Also, for example, the vehicle control device warns people riding in the vehicle MC by an alarm, or tightens up the seat belts in the vehicle, thereby holding the people in the seats.

Figure 7A:
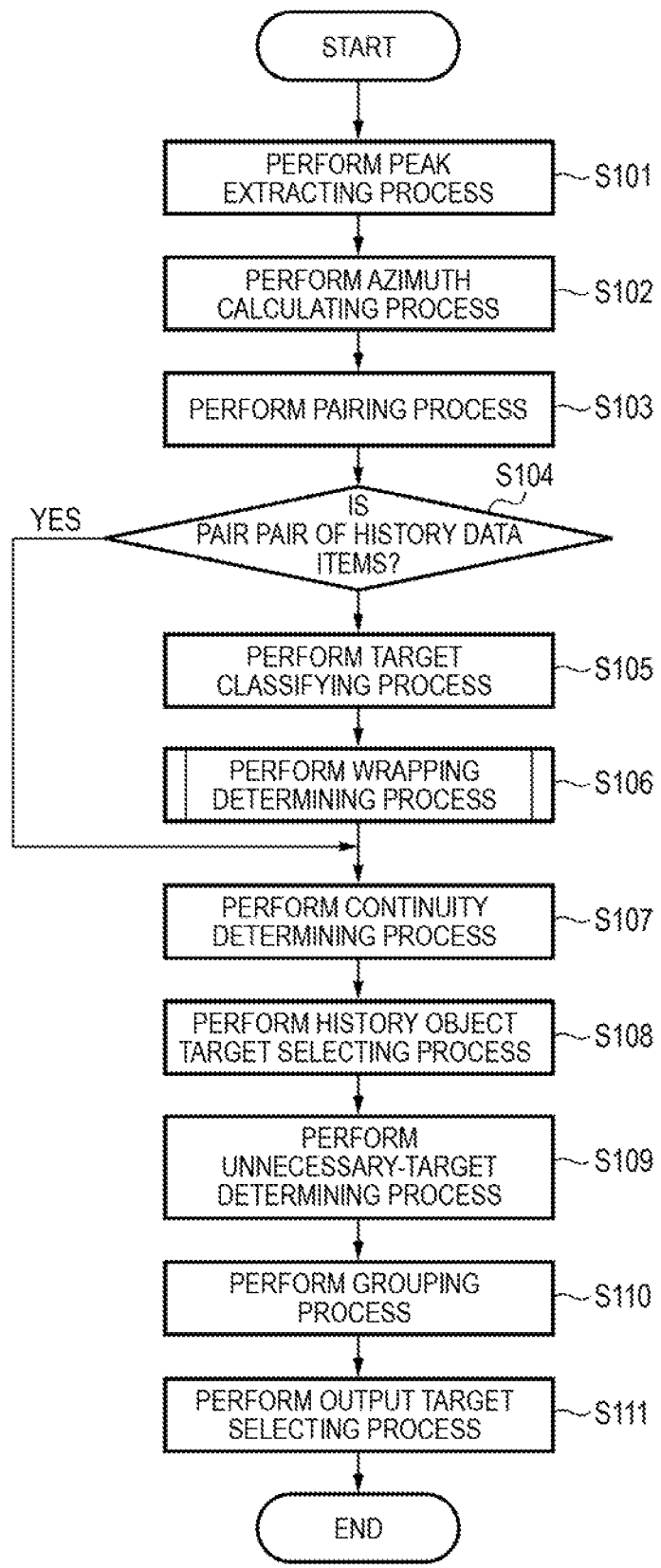
FIG. 7A is a flow chart illustrating the procedure of processes which are performed by a data processing unit of the radar device according to the first embodiment.
Figure 7B:
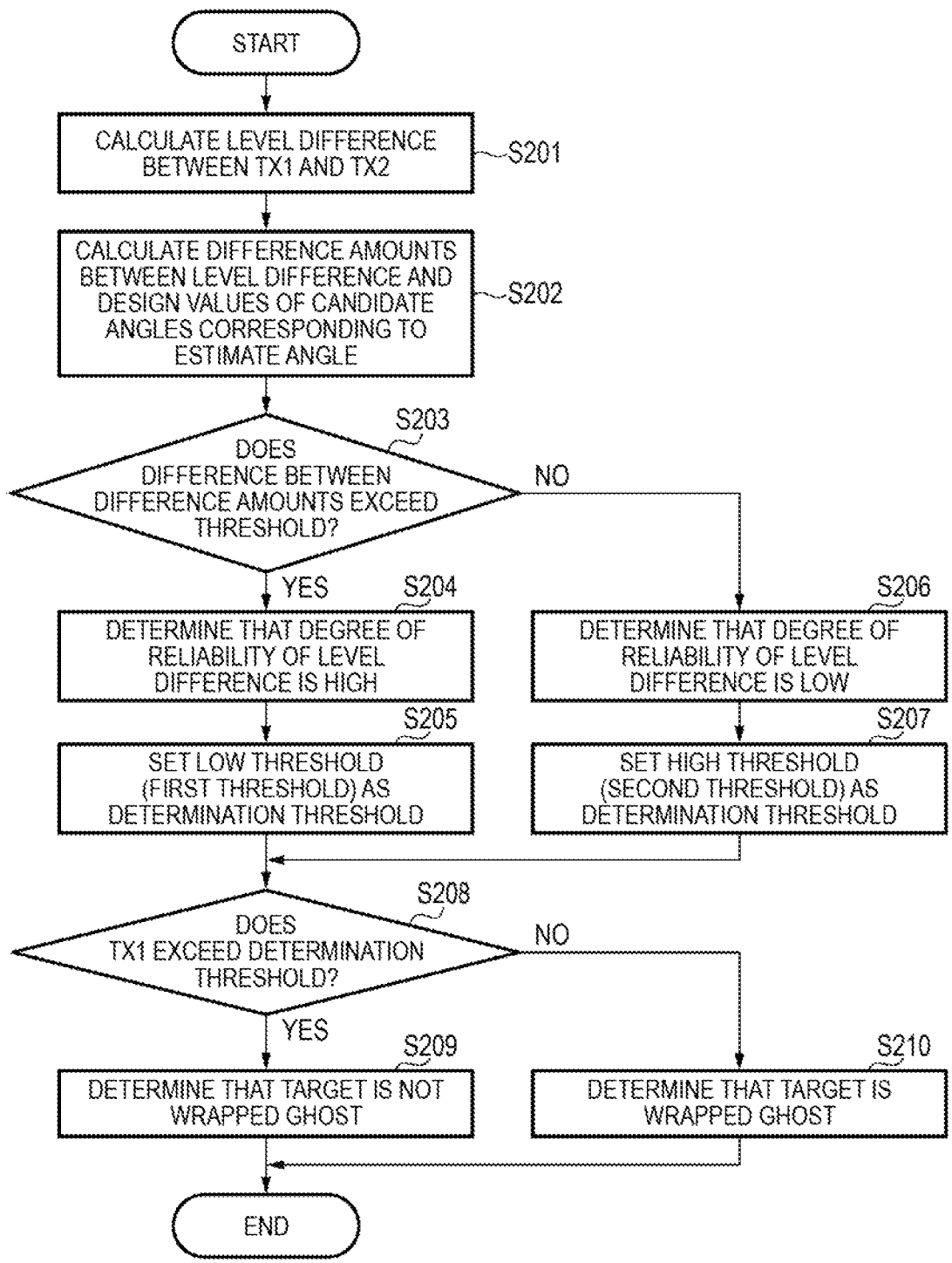
FIG. 7B is a flow chart illustrating the procedure of the wrapping determining process.

Now, the procedure of processes which are performed by the data processing unit 73 of the radar device 1 according to the present embodiment will be described with reference to FIGS. 7A to 7B. FIG. 7A is a flow chart illustrating the procedure of processes which are performed by the data processing unit 73 of the radar device 1 according to the first embodiment. Also, FIG. 7B is a flow chart illustrating the procedure of the wrapping determining process.

As shown in FIG. 7A, first, in STEP S101, the peak extracting unit 73*a* performs the peak extracting process. Subsequently, in STEP S102, the azimuth calculating unit 73*b* performs the azimuth calculating process on the basis of the result of the peak extracting process.

Subsequently, in STEP S103, the pairing unit 73*c* performs the pairing process on the basis of the result of the azimuth calculating process.

Next, in STEP S104, whether each pair of data items corresponds to a history object target detected in the past, that is, whether each pair is a pair of history data items is determined. In a case where a pair of data items is not a pair of history data items but a new pair of data items ("No" in STEP S104), in STEP S105, the target classifying unit 73*d* performs the target classifying process.

Subsequently, in STEP S106, the wrapping determining unit 73*e* performs the wrapping determining process. Meanwhile, in a case where it is determined in STEP S104 that a pair of data items is a pair of history data items ("Yes" in STEP S104), the control is transitioned to STEP S107.

Now, the procedure of the wrapping determining process will be described. As shown in FIG. 7B, in the wrapping determining process, in STEP S201, the level difference reliability determining unit 73*ea* calculates the level difference between corresponding reception levels TX1 and TX2. Subsequently, in STEP S202, the level difference reliability determining unit 73*ea* calculates the difference amounts between the level difference and design values of candidate angles corresponding to a corresponding estimate angle.

Next, in STEP S203, the level difference reliability determining unit 73*ea* determines whether the difference between the difference amounts exceeds the predetermined threshold. In a case where the difference between the difference amounts exceeds the predetermined threshold ("Yes" in STEP S203), in STEP S204, the level difference reliability determining unit 73*ea* determines that the degree of reliability of the level difference is high. Subsequently, in STEP S205, on the basis of the determination result, the target existence/non-existence determining unit 73*eb* sets the predetermined low threshold as the determination threshold.

Meanwhile, in a case where the difference between the difference amounts is equal to or smaller than the predetermined threshold ("No" in STEP S203), in STEP S206, the level difference reliability determining unit 73*ea* determines that the degree of reliability of the level difference is low. Subsequently, in STEP S207, on the basis of the determination result, the target existence/non-existence determining unit 73*eb* sets the predetermined high threshold as the determination threshold.

Next, in STEP S208, the target existence/non-existence determining unit 73*eb* determines whether the reception level TX1 exceeds the determination threshold. In a case where the reception level TX1 exceeds the determined that ("Yes" in STEP S208), in STEP S209, the target existence/non-existence determining unit 73*eb* determines that the target TG corresponding to the estimate angle is not a wrapped ghost G. Then, the wrapping determining process finishes. Therefore, even in a case where a cut-in vehicle CC retreating from the vehicle MC has been erroneously determined as a wrapped ghost G, if a corresponding reception level TX1 exceeds the determination threshold, since it is determined that the corresponding target TG is not a wrapped ghost G, it is possible to release the erroneous determination. The shapes of some retreating cut-in vehicles CC may cause erroneous level difference calculation, whereby those retreating cut-in vehicles CC may be erroneously determined as wrapped ghosts G. Also, in a case where a retreating cut-in vehicle CC is in front of the vehicle MC, a corresponding reception level TX1 is high. Therefore, the determination threshold is a reception level corresponding to a case where there is a different vehicle existing in front of the vehicle MC.

Meanwhile, in a case where the reception level TX1 is equal to or lower than the determination threshold ("No" in STEP S208), in STEP S210, the target existence/non-existence determining unit 73*eb* determines that the target TG corresponding to the estimate angle is a wrapped ghost G. Then, the wrapping determining process finishes.

Hereinafter, FIG. 7A will be further described from STEP S107. In STEP S107, the continuity determining unit 73*f* performs the continuity determining process. Subsequently, in STEP S108, on the basis of the result of the continuity determining process, the history object target selecting unit 73*g* performs a history object target selecting process.

Next, in STEP S109, on the basis of the result of the history object target selecting process, the unnecessary-target determining unit 73*h* performs the unnecessary-target determining process. Subsequently, in STEP S110, on the basis of the result of the unnecessary-target determining process, the grouping unit 73*i* performs the grouping process.

Subsequently, the output target selecting unit 73*j* performs the output target selecting process on the basis of the result of the grouping process in STEP S111, and outputs target information items on the targets TG selected as output objects to the external device. Then, the procedure finishes.

As described above, the radar device 1 according to the first embodiment is a radar device for calculating the angle of each target TG on the basis of the phase difference between reception signals if reflected waves from the corresponding target TG are received as reception signals by the plurality of receiving antennae 5, and includes the signal transmitting unit 2, the azimuth calculating unit 73*b* (corresponding to an example of a calculating unit), the level difference reliability determining unit 73*ea* (corresponding to an example of a first determining unit), and the target existence/non-existence determining unit 73*eb* (corresponding to an example of a second detecting unit).

The signal transmitting unit 2 alternately transmits narrow-angle beams BPS corresponding to examples of first transmission waves) and wide-angle beams BPW (corresponding to examples of second transmission waves) having different beam patterns.

On the basis of reception signals which reflected waves of a narrow-angle beam BPS and reflected waves of a wide-angle beam BPW from each target TG, the azimuth calculating unit 73*b* calculates the reception levels TX1 and TX2 based on the narrow-angle beam BPS and the wide-angle beam BPW, and an estimate angle of an angle at which the corresponding target exists.

The level difference reliability determining unit 73*ea* determines the degree of reliability of the level difference between the reception levels TX1 and TX2 calculated by the azimuth calculating unit 73*b* by comparing the level difference with level difference design values (corresponding to examples of reference values) associated with the estimate angle in advance.

On the base of the determination result of the level difference reliability determining unit 73*ea* and the reception level TX1 based on the narrow-angle beam BPS, the target existence/non-existence determining unit 73*eb* determines whether the corresponding target TG exists at the estimate angle.

Therefore, according to the radar device 1 of the first embodiment, it is possible to improve the accuracy of detection on targets TG.

Until now, the case whether the wrapping determining unit 73*e* determines whether a target TG exists on the basis of whether a corresponding reception level TX1 exceeds a determination threshold adjusted according to the degree of reliability of the level difference between corresponding reception levels has been described as an example. However, some real targets TG may be low-reflectivity objects and causes low reception levels TX1.

For this reason, with respect to target TG determined as wrapped ghosts G by the wrapping determining unit 73*e*, whether each target is a real low-reflectivity object may be determined. Hereinafter, this case will be described as a second embodiment.

Second Embodiment

Figure 8A:
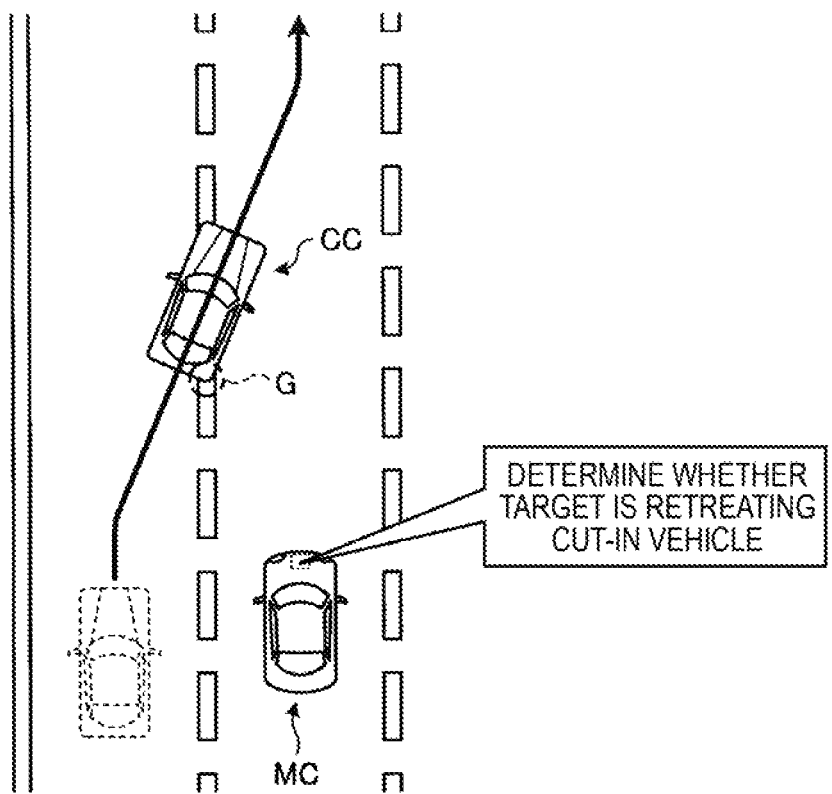
FIG. 8A is a view for explaining a first part of an overview of a second embodiment.
Figure 8B:
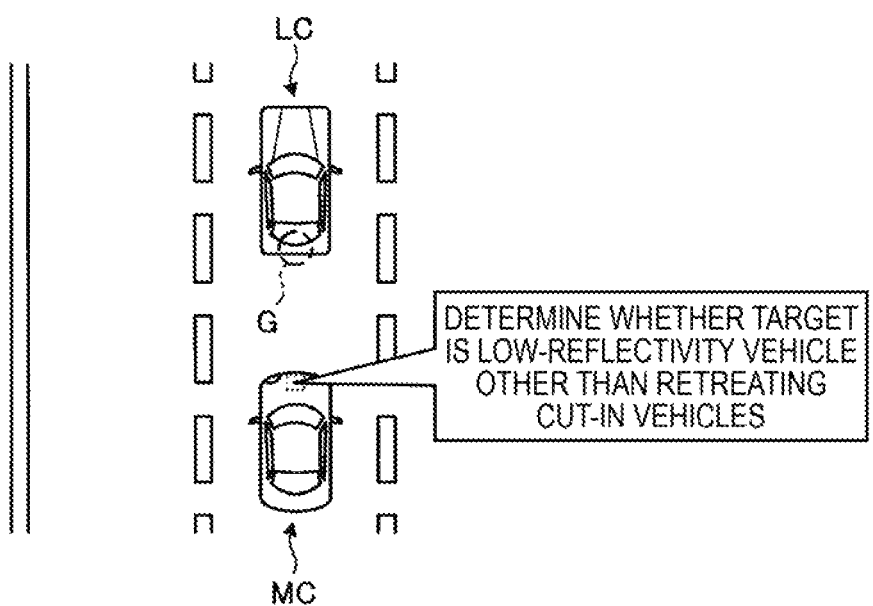
FIG. 8B is a view for explaining a second part of the overview of the second embodiment.

First, an overview of the second embodiment will be described with reference to FIGS. 8A and 8B. FIGS. 8A and 8B are views for explaining first and second parts of the overview of the second embodiment.

As an example of low-reflectivity objects which may be determined as a wrapped ghosts G, a cut-in vehicle CC which is a moving object and has a relative velocity representing that the cut-in vehicle is retreating from the vehicle MC as shown in FIG. 8A (hereinafter, referred to as a retreating cut-in vehicle CC) can be taken.

In the second embodiment, if a target TG is determined as a wrapped ghost, a process of determining whether the corresponding target is a retreating cut-in vehicle CC is performed. This determination is performed on the basis of the movement direction of the target TG.

Also, as another example of low-reflectivity objects, a low-reflectivity vehicle LC which is a moving object, for example, a vehicle which is not a retreating cut-in vehicles CC and is running in front of the vehicle MC as shown in FIG. 8B, can be taken.

In the second embodiment, if a target TG is determined as a wrapped ghost G, a process of determining whether the corresponding target is a low-reflectivity vehicle LC I is performed. This determination is performed on the basis of whether there is any other target TG which is assumed to be a wrapping cause of a wrapped ghost G.

Therefore, even in a case where a target TG is a low-reflectivity object which may be determined as a wrapped ghost G, it is possible to prevent the corresponding target from being erroneously determined as a wrapped ghost G. In other words, it is possible to improve the accuracy of detection on targets TG.

Figure 9:
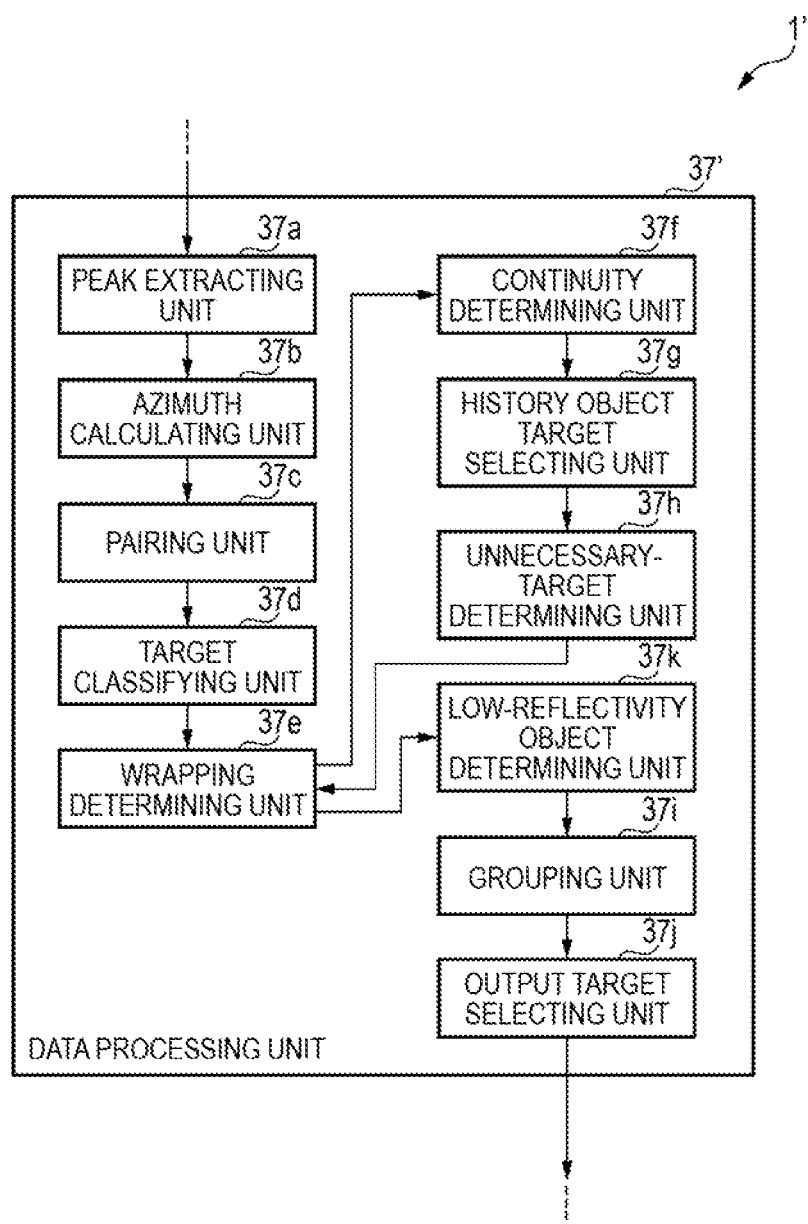
FIG. 9 is a block diagram illustrating a radar device according to the second embodiment.

Hereinafter, this will be described in more detail. FIG. 9 is a block diagram illustrating a radar device 1' according to the second embodiment. However, FIG. 9 shows only a data processing unit 73' corresponding to the data processing unit 73 of the radar device 1 shown in FIG. 2. The other components of the radar device 1' are the same as those of the radar device 1, and thus will not be described here.

Also, with reference to FIG. 9, parts different from those of the data processing unit 73 will be described, and the other processing units (such as the peak extracting unit 73*a*) described already will not be described or will be described in brief if necessary.

As shown in FIG. 9, the data processing unit 73' according to the second embodiment is different from the data processing unit 73 according to the first embodiment in that it further includes a low-reflectivity object determining unit 73*k*.

Also, the data processing unit 73' is different from the data processing unit 73 in that the wrapping determining process of the wrapping determining unit 73*e* is performed after the target classifying process of the target classifying unit 73*d* or the unnecessary-target determining process of the unnecessary-target determining unit 73*h*.

The low-reflectivity object determining unit 73*k* performs the low-reflectivity object determining process on the basis of the result of the wrapping determining process of the wrapping determining unit 73*e*. Then, the low-reflectivity object determining unit 73*k* outputs the result of the low-reflectivity object determining process to the grouping unit 73*i*.

The low-reflectivity object determining process which is performed by the low-reflectivity object determining unit 73*k* will be described in more detail with reference to FIGS. 10A to 10D. FIGS. 10A to 10D are views for explaining first to fourth parts of the procedure of the low-reflectivity object determining process.

As described above, if a target TG is determined as a wrapped ghost G, the low-reflectivity object determining unit 73*k* determines whether the corresponding target is a retreating cut-in vehicle CC, on the basis of the movement direction of the target.

Figure 10A:
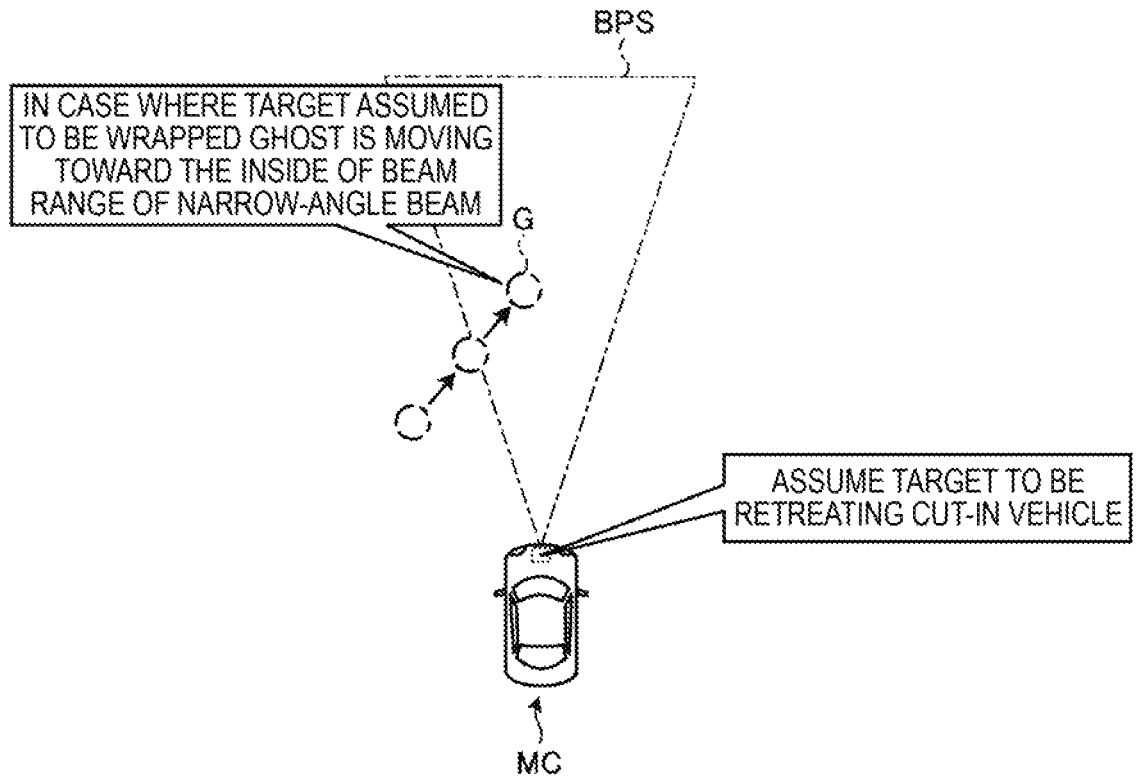
FIG. 10A is a view for explaining a first part of a low-reflectivity object determining process according to the second embodiment.

Specifically, as shown in FIG. 10A, in a case where a wrapped ghost G has a relative velocity representing that the wrapped ghost is retreating from the vehicle MC and moves toward the inside of the beam range of a narrow-angle beam BPS, the low-reflectivity object determining unit 73*k* assumes the wrapped ghost G to be a retreating cut-in vehicle CC.

If a wrapped ghost G is a wrapped ghost G from a vehicle having a relative velocity representing that the vehicle is retreating from the vehicle MC and continues running in an adjacent lane without cutting in, it can be considered that the wrapped ghost G is moving toward the outside of the beam range of a narrow-angle beam BPS unlike the movement direction shown in FIG. 10A.

This difference makes it possible to determine whether a wrapped ghost G corresponds to a retreating cut-in vehicle CC. Also, as another determination condition for determining whether the wrapped ghost G corresponds to a retreating cut-in vehicles CC, whether the corresponding wrapped ghost G has been detected in the range of a wide-angle beam BPW.

If the wrapped ghost G is detected from the beam range of a wide-angle beam BPW, it can be said that the wrapped ghost G is more likely to be a retreating cut-in vehicle CC.

Figure 10B:
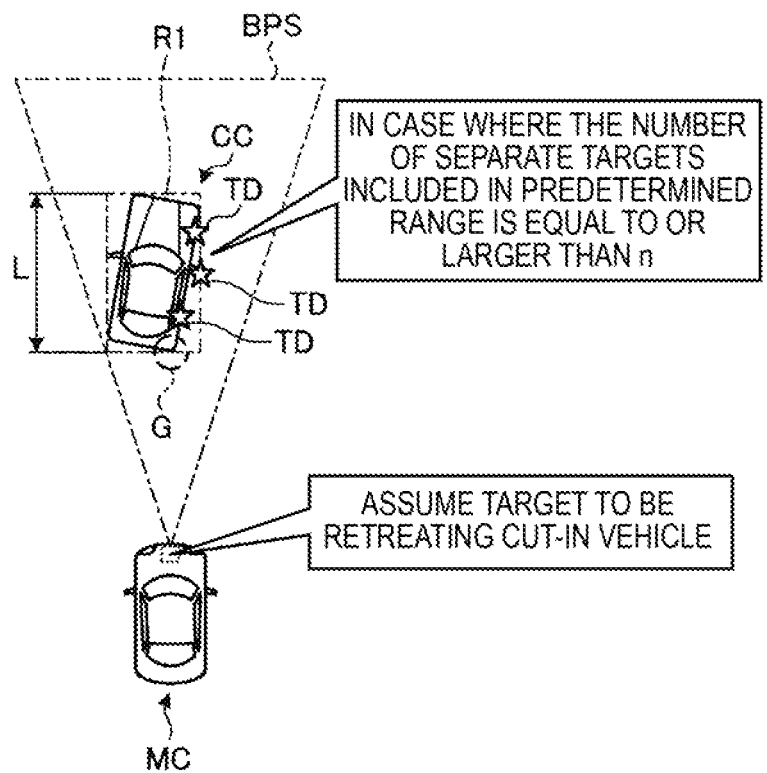
FIG. 10B is a view for explaining a second part of the low-reflectivity object determining process.

Thereafter, as shown in FIG. 10B, if the number of separate targets TD included in a predetermined range R1 from the wrapped ghost G assumed to be a retreating cut-in vehicle CC is equal to or larger than a predetermined number, the low-reflectivity object determining unit 73k determines that the wrapped ghost G is a retreating cut-in vehicle CC.

Here, the separate targets TD mean reflecting points of the same object as the target TG. For example, if the target TG is a vehicle, those reflecting points appear on edges, side surfaces, and so on of the vehicle. Therefore, it is preferable that the predetermined range R1 be a range extending from the wrapped ghost toward the opposite side to the vehicle MC and having, for example, a length corresponding to the vehicle length L.

According to the method shown in FIGS. 10A and 10B, it is possible to accurately detect retreating cut-in vehicles CC without erroneously determining them as wrapped ghosts G. Also, if the above-mentioned determination condition in which a wrapped ghost G should be detected from the beam range of a wide-angle beam BPW is added, it is possible to detect a retreating cut-in vehicle CC at an earlier stage.

Figure 10C:
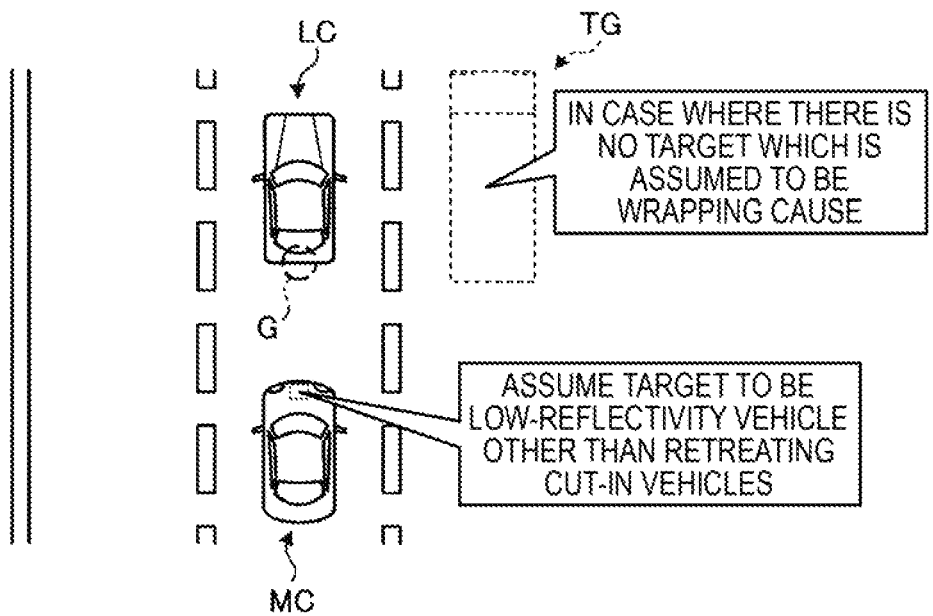
FIG. 10C is a view for explaining a third part of the low-reflectivity object determining process.

Meanwhile, as shown in FIG. 10C, in a case where a target TG is determined as a wrapped ghost G, if in a case where there is no other target TG which is assumed to be a wrapping cause of the wrapped ghost, the low-reflectivity object determining unit 73k assumes the corresponding wrapped ghost G to be a low-reflectivity vehicle LC other than retreating cut-in vehicles CC.

Thereafter, the low-reflectivity object determining unit 73k determines whether the determination condition described with reference to FIG. 10 is satisfied, that is, whether the number of separate targets TD included in a predetermined range R1 from the wrapped ghost G is equal to or larger than a predetermined number, or not. If the determination condition is satisfied, the low-reflectivity object determining unit determines that the wrapped ghost G is a low-reflectivity vehicle LC other than retreating cut-in vehicles CC. Therefore, it is possible to accurately detect low-reflectivity vehicles LC other than retreating cut-in vehicles CC, without erroneously determining them as wrapped ghosts G.

Figure 10D:
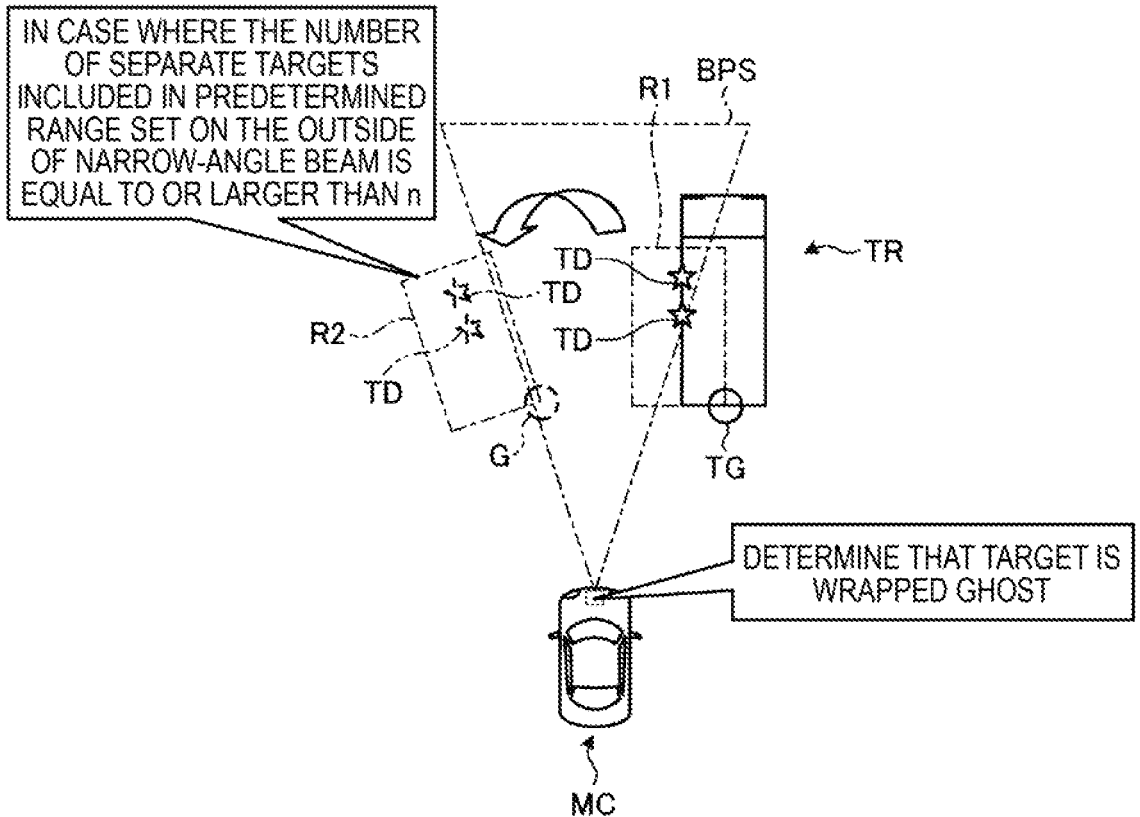
FIG. 10D is a view for explaining a fourth part of the low-reflectivity object determining process.

Also, as shown in FIG. 10D, in a case where the number of separate targets TD included in a predetermined range R2 set on the outside of a narrow-angle beam BPS with respect to the wrapped ghost G is equal to or larger than n, it is possible to determine that the wrapped ghost G is just a wrapped ghost G.

A predetermined range R2 corresponds to a range into which a predetermined range R1 from a target TG representing, for example, a truck TR existing in an adjacent lane is wrapped. Therefore, if there are separate targets TD in a predetermined range R1 relative to a real target TG, those separate targets TD are likely to be wrapped into a predetermined range R2 relative to the target. Therefore, it is possible to accurately detect wrapped ghosts G.

Figure 11A:
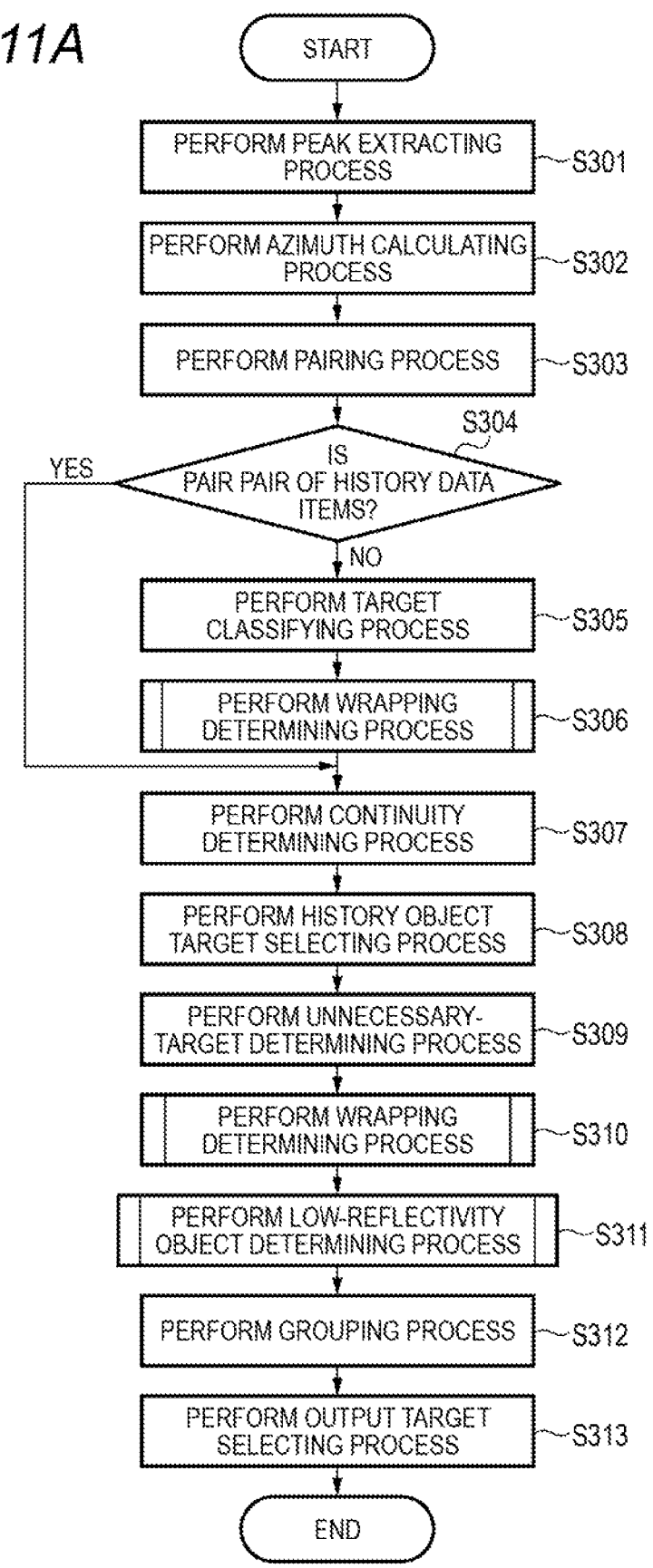
FIG. 11A is a flow chart illustrating the procedure of processes which are performed by a data processing unit of the radar device according to the second embodiment.
Figure 11B:
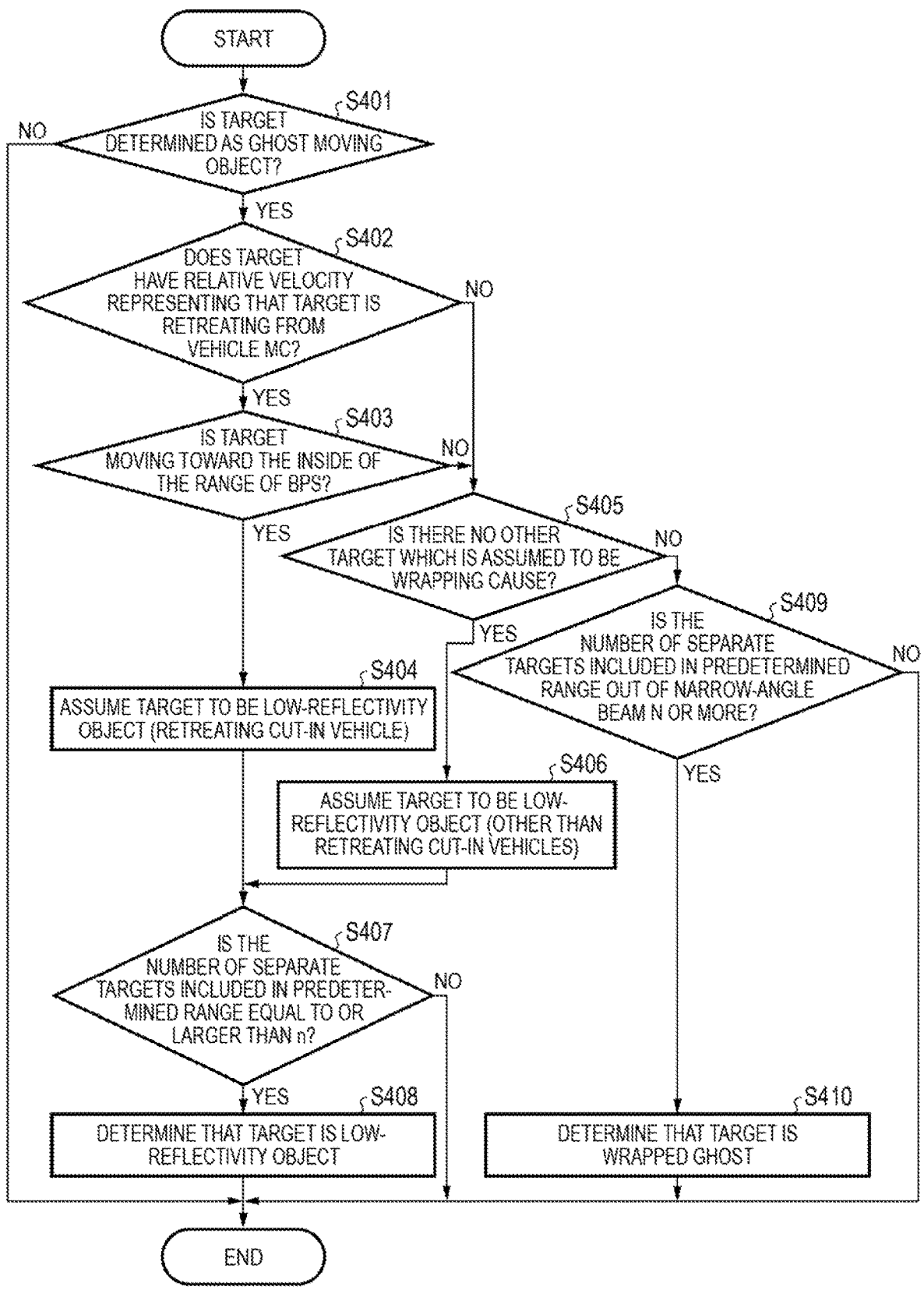
FIG. 11B is a flow chart illustrating the procedure of the low-reflectivity object determining process according to the second embodiment.

Now, the procedure of processes which are performed by the data processing unit 73' of the radar device 1' according to the present embodiment will be described with reference to FIGS. 11A and 11B. FIG. 11A is a flow chart illustrating the procedure of processes which are performed by the data processing unit 73' of the radar device 1' according to the second embodiment. Also, FIG. 11B is a flow chart illustrating the procedure of the low-reflectivity object determining process.

FIG. 11A corresponds to FIG. 7A, and STEPS S301 to S309 are identical to STEPS S101 to S109 of FIG. 7A. Also, STEPS S312 and S313 are identical to STEPS S110 and S111 of FIG. 7A. For this reason, points in which FIG. 11A is different from FIG. 7A will be described.

As shown in FIG. 11A, in the data processing unit 73', after the processes of STEPS S301 to S309 are performed, in STEP S310, the wrapping determining unit 73e performs the wrapping determining process again.

Subsequently, in STEP S311, the low-reflectivity object determining unit 73k performs the low-reflectivity object determining process on the basis of the result of the wrapping determining process.

Now, the procedure of the low-reflectivity object determining process will be described. As shown in FIG. 11B, in the low-reflectivity object determining process, first, in STEP S401, the low-reflectivity object determining unit 73k determines whether a target TG determined as a wrapped ghost G is a moving object.

In a case where the target TG is a moving object ("Yes" in STEP S401), in STEP S402, the low-reflectivity object determining unit 73k determines whether the target TG has a relative velocity representing that the target is retreating from the vehicle MC.

Meanwhile, in a case where it is determined in STEP S401 that the target TG is not a moving object ("No" in STEP S401), the low-reflectivity object determining process finishes.

In the case where the target TG has a relative velocity representing that the target is retreating from the vehicle MC ("Yes" in STEP S402), in STEP S403, the low-reflectivity object determining unit 73k determines whether the target TG is moving toward the inside of the beam range of a narrow-angle beam BPS.

In a case where the target TG is moving toward the inside of a narrow-angle beam BPS ("Yes" in STEP S403), in STEP S404, the low-reflectivity object determining unit 73k assumes the target TG to be a low-reflectivity object (a retreating cut-in vehicle CC). Then, the control is transitioned to STEP S407.

Meanwhile, in a case where the determination condition of STEP S402 or S403 is not satisfied ("No" in STEP S402 or S403), in STEP S405, with respect to the target TG, the low-reflectivity object determining unit 73k determines whether there is no other target TG which is assumed to be a wrapping cause.

In a case where there is no other target TG which is assumed to be a wrapping cause ("No" in STEP S405), in STEP S406, the low-reflectivity object determining unit 73k assumes the target TG to be a low-reflectivity object (a low-reflectivity vehicle LC other than retreating cut-in vehicles CC). Then, the control is transitioned to STEP S407.

In STEP S407, the low-reflectivity object determining unit 73k determines whether the number of separate targets TD included in a predetermined range R1 from the target TG is equal to or larger than n. In a case where the number of separate targets TD included in the predetermined range R1 is equal to or larger than n ("Yes" in STEP S407), in STEP S408, the low-reflectivity object determining unit 73k determines that the target TG is a low-reflectivity object. Then, the low-reflectivity object determining process finishes.

Meanwhile, in a case where the determination condition of STEP S407 is not satisfied ("No" in STEP S407), the low-reflectivity object determining unit 73k finishes the low-reflectivity object determining process.

Also, in a case where the determination condition of STEP S405 is not satisfied ("Yes" in STEP S405), in STEP S409, the low-reflectivity object determining unit 73k determines whether the number of separate targets TD included in a predetermined range R2 set on the outside of a narrow-angle beam BPS is equal to or larger than n.

In a case where the number of separate targets TD included in the predetermined range R2 is equal to or larger than n ("Yes" in STEP S409), the low-reflectivity object determining unit determines that the target TG is a wrapped ghost G, in STEP S410, and finishes the low-reflectivity object determining process.

Meanwhile, in a case where the determination condition of STEP S409 is not satisfied ("No" in STEP S409), the low-reflectivity object determining unit finishes the low-reflectivity object determining process.

Hereinafter, FIG. 11A will be further described from STEP S312. In STEP S312, the grouping unit 73i performs a grouping process on the basis of the result of the low-reflectivity object determining process.

Subsequently, in STEP S313, the output target selecting unit 73j performs the output target selecting process on the basis of the result of the grouping process, and outputs target information items on the targets TG selected as output objects to the external device. Then, the procedure finishes.

As described above, the radar device 1' according to the second embodiment further includes the low-reflectivity object determining unit 73k (corresponding to an example of a third determining unit).

If the wrapping determining unit 73e determines a target TG as a wrapped ghost G, the low-reflectivity object determining unit 73k determines whether the corresponding target is a low-reflectivity object, on the basis of the movement direction of the target TG or whether there is any other target TG (corresponding to an example of a different target) which is assumed to be a wrapping cause.

Therefore, according to the radar device 1' of the second embodiment, even if a target TG is a low-reflectivity object which may be erroneously determined as a wrapped ghost G, it is possible to prevent the corresponding target from being erroneously determined as a wrapped ghost G. In other words, it is possible to improve the accuracy of detection on targets TG.

In the individual embodiments described above, as examples, the radar device 1 or 1' has two transmitting antennae 4 and n-number of receiving antennae 5. However, as long as it is possible to detect a plurality of targets TG, the number of transmitting antennae and the number of receiving antennae may be changed.

Also, in the individual embodiments described above, as an example of the incidence direction estimating method which is used in the radar device 1 or 1', ESPRIT has been taken. However, the present invention is not limited thereto. For example, DBF (Digital Beam Forming), PRISM (Propagator method based on an Improved Spatial-smoothing Matrix), MUSIC (Multiple Signal Classification), and so on also may be used.

Also, in the individual embodiments described above, the radar device 1 or 1' is mounted on a vehicle; however, needless to say, it may be mounted on a moving object other than vehicles, such as a ship or an aircraft.

Various advantages and modifications can be easily achieved by those skilled in the art. Therefore, the invention in its broader aspects is not limited to the specific details and representative embodiments shown and described above.

Accordingly, various modifications may be made without departing from the spirit or scope of the general inventive concept as defined by the appended claims and their equivalents.

What is claimed is:

1. A radar device configured to calculate an angle of a target based on a phase difference between reception signals obtained by receiving reflected waves from the target with a plurality of receiving antennae, the radar device comprising:
   a transmitting unit configured to alternately transmit a first transmission wave and a second transmission wave having different beam patterns;
   a calculating unit configured to calculate reception levels of the respective reception signals of the reflected waves by the first transmission wave and the second transmission wave, and an estimate angle at which the target is estimated to exist, on the basis of the reception signals;
   a first determining unit configured to determine a degree of reliability of a level difference between the reception levels calculated by the calculating unit, on the basis of a comparison between the level difference with a reference value of the level difference which is associated with the estimate angle in advance; and
   a second determining unit configured to determine whether the target exists at the estimate angle, on the basis of a determination result of the first determining unit and the reception level based on the first transmission wave, wherein
   in a case where the first determining unit determines that the degree of reliability is high, the second determining unit sets a predetermined first threshold as a determination threshold, whereas in a case where the first determining unit determines that the degree of reliability is low, the second determining unit sets a predetermined second threshold which is greater than the predetermined first threshold as the determination threshold, and
   in a case where the reception level based on the first transmission wave exceeds the determination threshold, the second determining unit determines that the target corresponding to the estimate angle is not a wrapped ghost caused by phase wrapping, whereas in a case where the reception level based on the first transmission wave is equal to or lower than the determination threshold, the second determining unit determines that the target corresponding to the estimate angle is the wrapped ghost.

2. The radar device according to claim 1,
   wherein the first transmission wave and the second transmission wave have the same transmission axis,
   wherein a transmission range of the first transmission wave is narrower than a transmission range of the second transmission wave, and a transmission distance of the first transmission wave is longer than a transmission distance of the second transmission wave, and
   wherein the transmission range of the first transmission wave and the transmission range of the second transmission wave partially overlap with each other in the direction of the transmission axis.

3. The radar device according to claim 1,
   wherein the reference value is set for each of a plurality of candidate angles at which the target may actually exist so as to be associated with the estimate angle,
   wherein the first determining unit calculates difference amounts between the level difference and the reference value for each of the candidate angles, and wherein in a case where a difference between the difference amounts exceeds a predetermined threshold, the first determining unit determines that the degree of reliability is high, whereas in a case where the difference between the difference amounts is equal to or smaller than the predetermined threshold, the first determining unit determines that the degree of reliability is low.

4. The radar device according to claim 1, further comprising a target selecting unit configured to select the target as an object to be output to an external device, on the basis of a determination result of the second determining unit,
wherein if the second determining unit determines that the target is the wrapped ghost, the target selecting unit does not select the target as an object to be output.

5. The radar device according to claim 1, further comprising a third determining unit configured to determine whether the target determined as the wrapped ghost by the second determining unit is a low-reflectivity object, on the basis of a movement direction of the target or whether a different target assumed to be a wrapping cause of the target exists.

6. The radar device according to claim 5, wherein in a case where the target determined as the wrapped ghost has a relative velocity representing that the target is separating away from the radar device, and moves toward an inside of the transmission range of the first transmission wave, the third determining unit assumes the target to be the low-reflectivity object.

7. The radar device according to claim 6, wherein in a case where a number of reflecting points existing in a predetermined range from the target determined as the wrapped ghost is equal to or larger than a predetermined value, the third determining unit determines that the target is the low-reflectivity object.

8. The radar device according to claim 5, wherein in a case where the different target does not exist, the third determining unit assumes the target determined as the wrapped ghost to be the low-reflectivity object.

9. The radar device according to claim 5, wherein in a case where a number of reflecting points existing in a predetermined range set on the outside of the transmission range of the first transmission wave from the target determined as the wrapped ghost is equal to or larger than a predetermined value, the third determining unit determines that the target is the wrapped ghost.

10. A target detecting method for calculating an angle of a target based on a phase difference between reception signals obtained by receiving reflected waves from the target with a plurality of receiving antennae, the target detecting method comprising:
a transmitting process of alternately transmitting a first transmission wave and a second transmission wave having different beam patterns;
a calculating process of calculating reception levels of the respective reception signals of the reflected waves by the first transmission wave and the second transmission wave, and an estimate angle at which the target is estimated to exist, on the basis of the reception signals;
a first determining process of determining a degree of reliability of a level difference between the reception levels calculated by the calculating process, on the basis of a comparison between the level difference with a reference value of the level difference which is associated with the estimate angle in advance; and
a second determining process of determining whether the target exists at the estimate angle, on the basis of a determination result of the first determining process and the reception level based on the first transmission wave, wherein
in a case where the first determining process determines that the degree of reliability is high, the second determining process sets a predetermined first threshold as a determination threshold, whereas in a case where the first determining process determines that the degree of reliability is low, the second determining process sets a predetermined second threshold which is greater than the predetermined first threshold as the determination threshold, and
in a case where the reception level based on the first transmission wave exceeds the determination threshold, the second determining process determines that the target corresponding to the estimate angle is not a wrapped ghost caused by phase wrapping, whereas in a case where the reception level based on the first transmission wave is equal to or lower than the determination threshold, the second determining process determines that the target corresponding to the estimate angle is the wrapped ghost.

* * * * *